US007616368B2

(12) United States Patent
Hagood, IV

(10) Patent No.: US 7,616,368 B2
(45) Date of Patent: Nov. 10, 2009

(54) LIGHT CONCENTRATING REFLECTIVE DISPLAY METHODS AND APPARATUS

(75) Inventor: Nesbitt W. Hagood, IV, Wellesley, MA (US)

(73) Assignee: Pixtronix, Inc., Andover, MA (US)

( * ) Notice: Subject to any disclaimer, the term of this patent is extended or adjusted under 35 U.S.C. 154(b) by 268 days.

(21) Appl. No.: 11/362,422

(22) Filed: Feb. 23, 2006

(65) Prior Publication Data

US 2006/0250676 A1    Nov. 9, 2006

Related U.S. Application Data

(60) Provisional application No. 60/676,053, filed on Apr. 29, 2005, provisional application No. 60/655,827, filed on Feb. 23, 2005.

(51) Int. Cl.
G02B 26/00 (2006.01)
G09G 3/34 (2006.01)
H04N 5/74 (2006.01)

(52) U.S. Cl. .......................... 359/290; 385/43; 353/30; 353/32; 353/94; 353/98; 353/99; 345/84; 345/85; 345/87; 345/102; 345/108; 345/109; 362/97.3; 362/231; 362/241; 362/341; 348/740; 348/750; 348/756; 348/770; 348/771; 399/221; 399/3; 359/295; 359/298; 359/459; 359/627; 359/726

(58) Field of Classification Search ................... 385/43; 353/30–32, 94, 98, 99; 345/84, 85, 87, 102, 345/108, 109; 362/97.3, 231, 241, 341–350; 348/740, 750, 756, 770, 771; 399/221, 3–6; 359/223, 224, 290–292, 295, 298, 454, 455, 359/459, 627, 628, 726, 727

See application file for complete search history.

(56) References Cited

U.S. PATENT DOCUMENTS

| 4,067,043 A | 1/1978 | Perry |
| 4,074,253 A | 2/1978 | Nadir |
| 4,564,836 A | 1/1986 | Vuilleumier et al. |
| 4,582,396 A | 4/1986 | Bos et al. |
| 4,673,253 A | 6/1987 | Tanabe et al. |
| 4,744,640 A | 5/1988 | Phillips |
| 4,958,911 A | 9/1990 | Beiswenger et al. |
| 4,991,941 A | 2/1991 | Kalmanash |
| 5,005,108 A | 4/1991 | Pristash et al. |
| 5,042,900 A | 8/1991 | Parker |
| 5,050,946 A | 9/1991 | Hathaway et al. |

(Continued)

FOREIGN PATENT DOCUMENTS

EP    0 359 450 A2    9/1989

(Continued)

OTHER PUBLICATIONS

Feng et al, "Novel integrated light-guide plates for liquid crystal display backlight," J. Opt. A: Pure Appl. Opt., 7:111-117(2005).

(Continued)

*Primary Examiner*—Evelyn A. Lester
(74) *Attorney, Agent, or Firm*—Ropes & Gray LLP

(57) ABSTRACT

Improved apparatus and methods for displays are disclosed that utilize light concentration array between mechanical light modulators and the viewing surface of the display. The light concentration array includes an array of optical elements that concentrate light on respective ones of the light modulators to maximize the contrast ratio and off axis viewing of the display.

42 Claims, 10 Drawing Sheets

U.S. PATENT DOCUMENTS

| | | | |
|---|---|---|---|
| 5,062,689 A | 11/1991 | Koehler | |
| 5,093,652 A | 3/1992 | Bull et al. | |
| 5,128,787 A | 7/1992 | Blonder | |
| 5,136,480 A | 8/1992 | Pristash et al. | |
| 5,142,405 A | 8/1992 | Hornbeck | |
| 5,184,248 A | 2/1993 | de Vaan et al. | |
| 5,198,730 A | 3/1993 | Vancil | |
| 5,202,950 A | 4/1993 | Arego et al. | |
| 5,233,459 A | 8/1993 | Bozler et al. | |
| 5,245,454 A | 9/1993 | Blonder | |
| 5,319,491 A | 6/1994 | Selbrede | |
| 5,339,179 A | 8/1994 | Rudisill et al. | |
| 5,396,350 A | 3/1995 | Beeson et al. | |
| 5,416,631 A | 5/1995 | Yagi | |
| 5,440,197 A | 8/1995 | Gleckman | |
| 5,465,175 A | 11/1995 | Woodgate et al. | |
| 5,467,104 A | 11/1995 | Furness, III et al. | |
| 5,479,279 A | 12/1995 | Barbier et al. | |
| 5,493,439 A | 2/1996 | Engle | |
| 5,519,565 A | 5/1996 | Kalt et al. | |
| 5,528,262 A | 6/1996 | McDowall et al. | |
| 5,559,389 A | 9/1996 | Spindt et al. | |
| 5,568,964 A | 10/1996 | Parker et al. | |
| 5,578,185 A | 11/1996 | Bergeropn et al. | |
| 5,579,035 A | 11/1996 | Beiswenger | |
| 5,579,240 A | 11/1996 | Buus | |
| 5,596,339 A | 1/1997 | Furness, III et al. | |
| 5,613,751 A | 3/1997 | Parker et al. | |
| 5,618,096 A | 4/1997 | Parker et al. | |
| 5,619,266 A | 4/1997 | Tomita et al. | |
| 5,655,832 A | 8/1997 | Pelka et al. | |
| 5,659,327 A | 8/1997 | Furness, III et al. | |
| 5,666,226 A | 9/1997 | Ezra et al. | |
| 5,684,354 A | 11/1997 | Gleckman | |
| 5,694,227 A | 12/1997 | Starkweather | |
| 5,731,802 A | 3/1998 | Aras et al. | |
| 5,745,203 A | 4/1998 | Valliath et al. | |
| 5,771,321 A | 6/1998 | Stern | |
| 5,781,331 A | 7/1998 | Carr et al. | |
| 5,784,189 A | 7/1998 | Bozler et al. | |
| 5,794,761 A | 8/1998 | Renaud et al. | |
| 5,801,792 A | 9/1998 | Smith et al. | |
| 5,810,469 A * | 9/1998 | Weinreich | 362/298 |
| 5,835,255 A | 11/1998 | Miles | |
| 5,854,872 A | 12/1998 | Tai | |
| 5,867,302 A | 2/1999 | Fleming | |
| 5,876,107 A | 3/1999 | Parker et al. | |
| 5,884,872 A | 3/1999 | Greenhalgh | |
| 5,889,625 A | 3/1999 | Chen et al. | |
| 5,894,686 A | 4/1999 | Parker et al. | |
| 5,895,115 A | 4/1999 | Parker et al. | |
| 5,921,652 A | 7/1999 | Parker et al. | |
| 5,936,596 A | 8/1999 | Yoshida et al. | |
| 5,953,469 A | 9/1999 | Zhou | |
| 5,975,711 A | 11/1999 | Parker et al. | |
| 5,986,628 A | 11/1999 | Tuenge et al. | |
| 5,986,796 A | 11/1999 | Miles | |
| 5,990,990 A | 11/1999 | Crabtree | |
| 6,008,781 A | 12/1999 | Furness, III et al. | |
| 6,008,929 A | 12/1999 | Akimoto et al. | |
| 6,028,656 A | 2/2000 | Buhrer et al. | |
| 6,030,089 A | 2/2000 | Parker et al. | |
| 6,034,807 A | 3/2000 | Little et al. | |
| 6,040,796 A | 3/2000 | Matsugatani et al. | |
| 6,040,937 A | 3/2000 | Miles | |
| 6,046,840 A | 4/2000 | Huibers | |
| 6,049,317 A | 4/2000 | Thompson et al. | |
| 6,055,090 A | 4/2000 | Miles | |
| 6,079,838 A | 6/2000 | Parker et al. | |
| 6,130,735 A | 10/2000 | Hatanaka et al. | |
| 6,158,867 A | 12/2000 | Parker et al. | |
| 6,162,657 A | 12/2000 | Schiele et al. | |
| 6,168,395 B1 | 1/2001 | Quenzer et al. | |
| 6,174,064 B1 | 1/2001 | Kalantar et al. | |
| 6,201,633 B1 | 3/2001 | Peeters et al. | |
| 6,201,664 B1 | 3/2001 | Le et al. | |
| 6,206,550 B1 | 3/2001 | Fukushima et al. | |
| 6,219,119 B1 | 4/2001 | Nakai | |
| 6,249,370 B1 | 6/2001 | Takeuchi et al. | |
| 6,266,240 B1 | 7/2001 | Urban et al. | |
| 6,282,951 B1 | 9/2001 | Loga et al. | |
| 6,285,270 B1 | 9/2001 | Lane et al. | |
| 6,288,824 B1 | 9/2001 | Kastalsky | |
| 6,296,383 B1 | 10/2001 | Henningsen | |
| 6,300,154 B2 | 10/2001 | Clark et al. | |
| 6,317,103 B1 | 11/2001 | Furness, III et al. | |
| 6,323,834 B1 | 11/2001 | Colgan et al. | |
| 6,329,967 B1 | 12/2001 | Little et al. | |
| 6,367,940 B1 | 4/2002 | Parker et al. | |
| 6,402,335 B1 | 6/2002 | Kalantar et al. | |
| 6,424,329 B1 | 7/2002 | Okita | |
| 6,429,625 B1 | 8/2002 | LeFevre et al. | |
| 6,798,935 B2 | 8/2002 | Bourgeois et al. | |
| 6,471,879 B2 | 10/2002 | Hanson et al. | |
| 6,473,220 B1 | 10/2002 | Clikeman et al. | |
| 6,476,886 B2 | 11/2002 | Krusius et al. | |
| 6,483,613 B1 | 11/2002 | Woodgate et al. | |
| 6,498,685 B1 | 12/2002 | Johnson | |
| 6,504,985 B2 | 1/2003 | Parker et al. | |
| 6,507,138 B1 | 1/2003 | Rodgers et al. | |
| 6,508,563 B2 | 1/2003 | Parker et al. | |
| 6,523,961 B2 | 2/2003 | Ilkov et al. | |
| 6,529,250 B1 | 3/2003 | Murakami et al. | |
| 6,529,265 B1 | 3/2003 | Henningsen | |
| 6,531,947 B1 | 3/2003 | Weaver et al. | |
| 6,532,044 B1 | 3/2003 | Conner et al. | |
| 6,535,256 B1 | 3/2003 | Ishihara et al. | |
| 6,535,311 B1 | 3/2003 | Lindquist | |
| 6,556,258 B1 | 4/2003 | Yoshida et al. | |
| 6,556,261 B1 | 4/2003 | Krusius et al. | |
| 6,559,827 B1 | 5/2003 | Mangerson | |
| 6,567,063 B1 | 5/2003 | Okita | |
| 6,567,138 B1 | 5/2003 | Krusius et al. | |
| 6,574,033 B1 | 6/2003 | Chui et al. | |
| 6,582,095 B1 | 6/2003 | Toyoda | |
| 6,852,095 B1 | 6/2003 | Toyoda | |
| 6,589,625 B1 | 7/2003 | Kothari et al. | |
| 6,591,049 B2 | 7/2003 | Williams et al. | |
| 6,600,474 B1 | 7/2003 | Heines et al. | |
| 6,859,625 B2 | 7/2003 | Kothari et al. | |
| 6,893,677 B2 | 7/2003 | Behin et al. | |
| 6,626,540 B2 | 9/2003 | Ouchi et al. | |
| 6,639,570 B2 | 10/2003 | Furness, III et al. | |
| 6,639,572 B1 | 10/2003 | Little et al. | |
| 6,650,455 B2 | 11/2003 | Miles | |
| 6,650,822 B1 | 11/2003 | Zhou | |
| 6,671,078 B2 | 12/2003 | Flanders et al. | |
| 6,674,562 B1 | 1/2004 | Miles | |
| 6,677,709 B1 | 1/2004 | Ma et al. | |
| 6,677,936 B2 | 1/2004 | Jacobsen et al. | |
| 6,680,792 B2 | 1/2004 | Miles | |
| 6,690,422 B1 | 2/2004 | Daly et al. | |
| 6,701,039 B2 | 3/2004 | Bourgeois et al. | |
| 6,707,176 B1 | 3/2004 | Rodgers | |
| 6,710,538 B1 | 3/2004 | Ahn et al. | |
| 6,710,908 B2 | 3/2004 | Miles et al. | |
| 6,710,920 B1 | 3/2004 | Mashitani et al. | |
| 6,712,481 B2 | 3/2004 | Parker et al. | |
| 6,731,355 B2 | 5/2004 | Miyashita | |
| 6,731,492 B2 | 5/2004 | Goodwin-Johansson | |
| 6,733,354 B1 | 5/2004 | Cathey et al. | |
| 6,738,177 B1 | 5/2004 | Gutierrez et al. | |
| 6,741,377 B2 | 5/2004 | Miles | |
| 6,749,312 B2 | 6/2004 | Parker et al. | |

| | | | | | |
|---|---|---|---|---|---|
| 6,750,930 B2 | 6/2004 | Yoshii et al. | 2002/0080598 A1 | 6/2002 | Parker et al. |
| 6,752,505 B2 | 6/2004 | Parker et al. | 2002/0126364 A1 | 9/2002 | Miles |
| 6,755,547 B2 | 6/2004 | Parker | 2002/0126387 A1 | 9/2002 | Ishikawa et al. |
| 6,762,743 B2 | 7/2004 | Yoshihara et al. | 2002/0141174 A1 | 10/2002 | Parker et al. |
| 6,762,868 B2 | 7/2004 | Liu et al. | 2002/0163482 A1 | 11/2002 | Sullivan |
| 6,764,796 B2 | 7/2004 | Fries | 2002/0163484 A1 | 11/2002 | Furness, III et al. |
| 6,774,964 B2 | 8/2004 | Funamoto et al. | 2002/0171327 A1 | 11/2002 | Miller et al. |
| 6,775,048 B1 | 8/2004 | Starkweather et al. | 2002/0185699 A1 | 12/2002 | Reid |
| 6,778,228 B2 | 8/2004 | Murakami et al. | 2002/0196522 A1 | 12/2002 | Little et al. |
| 6,785,454 B2 | 8/2004 | Abe | 2003/0007344 A1 | 1/2003 | Parker |
| 6,788,371 B2 | 9/2004 | Tanada et al. | 2003/0009898 A1 | 1/2003 | Slocum et al. |
| 6,794,119 B2 | 9/2004 | Miles | 2003/0029705 A1 | 2/2003 | Qiu et al. |
| 6,796,668 B2 | 9/2004 | Parker et al. | 2003/0036215 A1 | 2/2003 | Reid |
| 6,800,996 B2 | 10/2004 | Nagai et al. | 2003/0043157 A1 | 3/2003 | Miles |
| 6,819,465 B2 | 11/2004 | Clikeman et al. | 2003/0048036 A1 | 3/2003 | Lemkin |
| 6,822,734 B1 | 11/2004 | Eidelman et al. | 2003/0058543 A1 | 3/2003 | Sheedy et al. |
| 6,825,470 B1 | 11/2004 | Bawolek et al. | 2003/0076649 A1 | 4/2003 | Speakman |
| 6,825,499 B2 | 11/2004 | Nakajima et al. | 2003/0085650 A1 | 5/2003 | Cathey et al. |
| 6,827,456 B2 | 12/2004 | Parker et al. | 2003/0085867 A1 | 5/2003 | Grabert |
| 6,831,678 B1 | 12/2004 | Travis | 2003/0095081 A1 | 5/2003 | Furness, III et al. |
| 6,835,111 B2 | 12/2004 | Ahn et al. | 2003/0095398 A1 | 5/2003 | Parker et al. |
| 6,846,082 B2 | 1/2005 | Glent-Madsen et al. | 2003/0102810 A1 | 6/2003 | Cross et al. |
| 6,847,425 B2 | 1/2005 | Tanada et al. | 2003/0123245 A1 | 7/2003 | Parker et al. |
| 6,857,751 B2 | 2/2005 | Penn et al. | 2003/0123246 A1 | 7/2003 | Parker |
| 6,687,896 B1 | 3/2005 | Miles | 2003/0123247 A1 | 7/2003 | Parker et al. |
| 6,863,219 B1 | 3/2005 | Jacobsen et al. | 2003/0133284 A1 | 7/2003 | Chipchase et al. |
| 6,864,618 B2 | 3/2005 | Miller et al. | 2003/0137499 A1 | 7/2003 | Iisaka |
| 6,867,896 B2 | 3/2005 | Miles | 2003/0174422 A1 | 9/2003 | Miller et al. |
| 6,886,956 B2 | 5/2005 | Parker et al. | 2003/0174931 A1 | 9/2003 | Rodgers et al. |
| 6,887,202 B2 | 5/2005 | Currie et al. | 2003/0184189 A1 | 10/2003 | Sinclair |
| 6,888,678 B2 | 5/2005 | Nishiyama et al. | 2003/0190535 A1 | 10/2003 | Fries |
| 6,897,164 B2 | 5/2005 | Baude et al. | 2003/0190536 A1 | 10/2003 | Fries |
| 6,900,072 B2 | 5/2005 | Patel et al. | 2003/0202338 A1 | 10/2003 | Parker |
| 6,906,847 B2 | 6/2005 | Huibers et al. | 2003/0023110 A1 | 12/2003 | Yoshihara et al. |
| 6,911,891 B2 | 6/2005 | Qiu et al. | 2003/0231160 A1 | 12/2003 | Yoshihara et al. |
| 6,911,964 B2 | 6/2005 | Lee et al. | 2004/0012946 A1 | 1/2004 | Parker et al. |
| 6,919,981 B2 | 7/2005 | Clikeman et al. | 2004/0058532 A1 | 3/2004 | Miles et al. |
| 6,934,080 B2 | 8/2005 | Saccomanno et al. | 2004/0080240 A1 | 4/2004 | Miller et al. |
| 6,936,968 B2 | 8/2005 | Cross et al. | 2004/0080484 A1 | 4/2004 | Heines et al. |
| 6,939,013 B2 | 9/2005 | Asao | 2004/0080927 A1 | 4/2004 | Parker et al. |
| 6,940,631 B2 | 9/2005 | Ishikawa | 2004/0085749 A1 | 5/2004 | Parker et al. |
| 6,943,495 B2 | 9/2005 | Ma et al. | 2004/0090144 A1 | 5/2004 | Miller et al. |
| 6,947,107 B2 | 9/2005 | Yoshii et al. | 2004/0095739 A1 | 5/2004 | Parker et al. |
| 6,950,240 B2 | 9/2005 | Matsuo et al. | 2004/0100677 A1 | 5/2004 | Huibers et al. |
| 6,953,375 B2 | 10/2005 | Ahn et al. | 2004/0114346 A1 | 6/2004 | Parker et al. |
| 6,962,419 B2 | 11/2005 | Huibers | 2004/0122328 A1 | 6/2004 | Wang et al. |
| 6,965,375 B1 | 11/2005 | Gettemy et al. | 2004/0125346 A1 | 7/2004 | Huibers |
| 6,969,635 B2 | 11/2005 | Patel et al. | 2004/0135273 A1 | 7/2004 | Parker et al. |
| 6,985,205 B2 | 1/2006 | Chol et al. | 2004/0135951 A1 | 7/2004 | Stumbo et al. |
| 7,004,610 B2 | 2/2006 | Yamashita et al. | 2004/0136204 A1 | 7/2004 | Asao |
| 7,004,611 B2 | 2/2006 | Parker et al. | 2004/0145580 A1 | 7/2004 | Perlman |
| 7,012,726 B1 | 3/2006 | Miles | 2004/0157664 A1 | 8/2004 | Link |
| 7,012,732 B2 | 3/2006 | Miles | 2004/0165372 A1 | 8/2004 | Parker |
| 7,014,349 B2 | 3/2006 | Shinohara et al. | 2004/0171206 A1 | 9/2004 | Rodgers |
| 7,042,618 B2 | 5/2006 | Selbrede et al. | 2004/0179146 A1 | 9/2004 | Nilsson |
| 7,042,643 B2 | 5/2006 | Miles | 2004/0196215 A1 | 10/2004 | Duthaler et al. |
| 7,046,905 B1 | 5/2006 | Gardiner et al. | 2004/0207768 A1 | 10/2004 | Liu |
| 2001/0001260 A1 | 5/2001 | Parker et al. | 2004/0218149 A1 | 11/2004 | Huibers |
| 2001/0028993 A1 | 10/2001 | Sanford | 2004/0218154 A1 | 11/2004 | Huibers |
| 2001/0043208 A1 | 11/2001 | Furness, III et al. | 2004/0218292 A1 | 11/2004 | Huibers |
| 2001/0053075 A1 | 12/2001 | Parker et al. | 2004/0218293 A1 | 11/2004 | Huibers |
| 2002/0001051 A1 | 1/2002 | Krusius et al. | 2004/0223088 A1 | 11/2004 | Huibers |
| 2002/0009275 A1 | 1/2002 | Williams et al. | 2004/0223240 A1 | 11/2004 | Huibers |
| 2002/0015215 A1 | 2/2002 | Miles | 2004/0227428 A1 | 11/2004 | Sinclair |
| 2002/0024641 A1 | 2/2002 | Ilkov et al. | 2004/0233392 A1 | 11/2004 | Huibers |
| 2002/0024711 A1 | 2/2002 | Miles | 2004/0240032 A1 | 12/2004 | Miles |
| 2002/0047172 A1 | 4/2002 | Reid | 2004/0246275 A1 | 12/2004 | Yoshihara et al. |
| 2002/0054424 A1 | 5/2002 | Miles | 2004/0263944 A1 | 12/2004 | Miles et al. |
| 2002/0054487 A1 | 5/2002 | Parker et al. | 2005/0002082 A1 | 1/2005 | Miles |
| 2002/0056900 A1 | 5/2002 | Liu et al. | 2005/0002086 A1 | 1/2005 | Starkweather et al. |
| 2002/0063661 A1 | 5/2002 | Comiskey et al. | 2005/0007759 A1 | 1/2005 | Parker |
| 2002/0070931 A1 | 6/2002 | Ishikawa | 2005/0024849 A1 | 2/2005 | Parker et al. |
| 2002/0075555 A1 | 6/2002 | Miles | 2005/0059184 A1 | 3/2005 | Sniegowski et al. |

| | | |
|---|---|---|
| 2005/0062708 A1 | 3/2005 | Yoshihara et al. |
| 2005/0063037 A1 | 3/2005 | Selebrede et al. |
| 2005/0072032 A1 | 4/2005 | McCollum et al. |
| 2005/0088404 A1 | 4/2005 | Heines et al. |
| 2005/0093465 A1 | 5/2005 | Yonekubo et al. |
| 2005/0094240 A1 | 5/2005 | Huibers et al. |
| 2005/0094418 A1 | 5/2005 | Parker |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157365 A1 | 7/2005 | Ravnkilde et al. |
| 2005/0157376 A1 | 7/2005 | Huibers et al. |
| 2005/0168789 A1 | 8/2005 | Glent-Madsen |
| 2005/0171408 A1 | 8/2005 | Parker |
| 2005/0195468 A1 | 9/2005 | Sampsell |
| 2005/0207154 A1 | 9/2005 | Parker |
| 2005/0207178 A1 | 9/2005 | Parker |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0237596 A1 | 10/2005 | Selbrede |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0258571 A1 | 11/2005 | Dumond et al. |
| 2005/0259198 A1 | 11/2005 | Lubart et al. |
| 2005/0286114 A1 | 12/2005 | Miles |
| 2006/0028811 A1 | 2/2006 | Ross, Jr. et al. |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033975 A1 | 2/2006 | Miles |
| 2006/0004928 A1 | 3/2006 | Chui et al. |
| 2006/0044246 A1 | 3/2006 | Mignard |
| 2006/0044928 A1 | 3/2006 | Chui et al. |
| 2006/0092490 A1 | 5/2006 | McCollum et al. |
| 2006/0104061 A1* | 5/2006 | Lerner et al. ............... 362/249 |

FOREIGN PATENT DOCUMENTS

| | | |
|---|---|---|
| EP | 0 415 625 A2 | 3/1991 |
| EP | 0 438 614 A1 * | 7/1991 |
| EP | 0 359 450 B1 | 11/1994 |
| EP | 0 495 273 B1 | 9/1996 |
| EP | 0 415 625 B1 | 1/1997 |
| EP | 0 751 340 A2 | 1/1997 |
| EP | 0 884 525 A2 | 12/1998 |
| EP | 0 751 340 B1 | 5/2000 |
| EP | 1 202 096 A2 | 5/2002 |
| EP | 1 426 190 A1 | 6/2004 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002-318564 A | 10/2002 |
| JP | 2003-162904 | 6/2003 |
| WO | WO 94/01716 | 1/1994 |
| WO | WO 98/04950 | 2/1998 |
| WO | WO 99/01696 | 1/1999 |
| WO | WO 00/50807 | 8/2000 |
| WO | WO 03/008860 A1 | 1/2003 |
| WO | WO 03/050448 A1 | 7/2003 |
| WO | WO 03/061329 A2 | 7/2003 |
| WO | WO 2004/019120 A1 | 3/2004 |
| WO | WO 2004/086098 A2 | 10/2004 |
| WO | WO 2005/001892 A2 | 1/2005 |
| WO | WO 2005/062908 A2 | 7/2005 |
| WO | WO 2006/023077 A2 | 3/2006 |
| WO | WO 2006/039315 A2 | 4/2006 |
| WO | WO 2006/052755 A2 | 5/2006 |

OTHER PUBLICATIONS

Kalantar et al, "Optical Micro Deflector Based Functional Light-Guide Plate for Backlight Unit," SID 00 Digest, 1029-1031(2000).

Ravnkilde et al, "Fabrication of Nickel Microshutter Arrays for Spatial Light Modulation".

"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.

Wang et al, "Highly Space-Efficient Electrostatic Zigzag Transmissive Micro-Optic Switches for an Integrated MEMS Optical Display System,".

Lee et al, "P-25: A LCOS Microdisplay Driver with Frame Buffering Pixels," SID 02 Digest, 292-295(2002).

McLaughlin, "Progress in Projection and Large-Area Displays," Proceedings of the IEEE, 90(4):521-532(Apr. 2002).

Sato, "Research on Flexible Display Systems," Broadcast Technology, 21:10-15(2005).

Doane, et al, "Display Technologies in Russia, Ukraine, and Belarus," World Technology Evaluation Center Panel Report (Dec. 1994).

Kuang et al, "Dynamic Characteristics of shaped micro-actuators solved using the differential quadrature method," J. Micromech. Microeng. 14:647-655(2004).

Li et al, "Drie-Fabricated Curved-Electrode Zipping Actuators with Low Pull-In Voltage," IEE, 480-483 (2003).

Legtenberg et al, "Electrostatic Curved Electrode Actuators," Journal of Microelectromechanical Systems, 6:3(257-265)(Sep. 1997).

Perregaux et al, "Arrays of Addressable High-Speed Optical Microshutters," CSEM Swiss Center for Electronics and Microtechnology Inc., Microsystems Division.

Steyn, Lodewyck, "Electroquasistatic Zipper Actuators: A Technology Review", Dec. 2004.

Okumura et al, "Highly-efficient backlight for liquid crystal display having no optical films," Applied Physics Letters, 83(13):2515-2517(Sep. 2003).

Funamoto et al, "Diffusive-sheetless Backlight System for Mobile Phone," IDW/AD, 1277-1280(2005).

"Optical Design Tools for Backlight Displays," Optical Research Associates, 1-8.

Sony ACX705AKM, 6.92cm Diagonal Reflective Color LCD Module.

Low-Temperature Polysilicon TFT Reflective Color LCD by Techno World.

AZ Displays, Inc. Complete LCD Solutions, ATM3224C-NC-FTH.

Sharp Specification No. LCP-03015 for Mobile Liquid Crystal Display Group, Sharp Corporation, Jun. 13, 2003.

Tien et al, "MEMS Actuators for Silicon Micro-Optical Elements," Proc. of SPIE, 4178:256-269, (2000).

"Two Proprietary Technologies Supporting OMRON Backlight," OMRON Electronics Corporation, OMRON Electronics Components Web, www.omron.co.jp/ecb/products/bklight/english/genri/index.html.

"MicroLens™—Re-Inventing LCD Backlighting," Global Lighting Technologies Inc., http://www.glthome.com/tech.htm, 1-2.

"BLU," Heesung Precision Ltd., http://www.hspr.co.kr/eng/product/blu.asp Retrieved on Aug. 3, 2006.

Teijido, J.M., "Conception and Design of Illumination Light Pipes," Thesis No. 1498 for University of Neuchatel, http://www.unige.ch/cyberdocuments/unine/theses2000/TeijidoJM/these_front.htm I:1-99 Retrieved on Aug. 3, 2006.

"Prism Sheet," Mitsubishi Rayon America Inc., http://www.mrany.com/data/HTML/29.htm Retrieved on Aug. 4, 2006.

"Two Proprietary Technologies Supporting OMRON Backlight," OMRON Electronics Corporation, http:/www.omron.co.jp/ecb/products/bklight/english/genri/index.html Retrieved on Aug. 3, 2006.

Liu et al, "Scaling Laws of Microactuators and Potential Applications of Electroactive Polymers in MEMS," SPIE, 3669:345-354(Mar. 1999).

Vangbo et al, "A lateral symmetrically bistable buckled beam," J. Micromech. Microeng., 8:29-32(1998).

Shikida et al, "Fabrication fo an S-shaped Microactuator," Journal of Microelectromechanical Systems, 6(1):18-24(Mar. 1997).

Qui et al, "A High-Current Electrothermal Bistable MEMS Relay,".

Qiu et al, "A Curved-Beam Bistable Mechanism," Journal of Microelectromechanical Systems, 13(2):137-145(Apr. 2004).

Yasumura et al, "Fluid Damping of an Electrostatic Actuator for Optical Switching Appilcations," Transducers Research Foundation (2002).

Underwood, "LCoS through the looking glass," SID(2001).

Clark et al, "FLC Microdisplays," Ferroelectrics, 246:97-110(2000).

Boeuf, "Plasma display panels: physics, recent developments and key issues," J. Phys. D: Appl, Phys., 36:R53-R79(2003).

Hornbeck, "Digital Light Processing™: A New MEMS-Based Display Technology," Texas Instruments.

Yamada et al, "52.2: Invited Paper:Color Sequential LCD Based on OCB with an LED Backlight," SID 00 Digest, 1180-1183(2000).

Jepsen et al, "4.11: 0.9" SXGA Liquid Crystal on Silicon Panel with 450 Hz. Field Rate, MicroDisplay Coropration, 106-109.

Birch et al, "31.1: SXGA Resolution FLC Microdisplays," SID 02 Digest, 954-957(2002).

Koden et al, "Ferroelectric Liquid Crystal Display," (Sep. 17, 1997).

Jones et al, "29-1: Addressing τVmin Ferroelectric Liquid Crystal Displays," (1998).

Akimoto et al, "15.1: A 0.9-in UXGA/HDTV FLC Microdisplay," SID 00 Digest, 194-197(2000).

Bryan-Brown, "Ultra Low Poer Bistable LCDs," SID 00, 76-79(2000).

Hewlett et al, "DLP Cinema™ projection: A hybrid frame-rate technique for flicker-free performance," Journ of the SID 9/3, 221-226(2001).

Underwood, "A review of microdisplay technologies," SID@EID, (Nov. 21 to 23, 2000).

Blackstone, "Making MEMS Reliable," SPIE's OEMagazine, 32-34(Sep. 2002).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

Johnstone et al, "Theoretical limits on the freestanding length of cantilevers produced by surface micromachining technology," J. Micromech. Microeng. 12:855-861(2002).

Maboudian et al, "Stiction reduction processes for surface micromachines," Tribology Letters, 3:215-221(1997).

"Electronic Display Lighting Tutorials," 3M Corporation, file?//D:/Optical\Vikuiti Tutorial.htm. retrieved on Aug. 10, 2006.

Roosendaal et al, "25.2: A Wide Gamut, High Aperture Mobile Spectrum Sequential Liquid Crystal Display," SID 05 Digest, 1116-1119(2005).

Feng, "High Quality Light Guide Plates that Can Control the Illumination Angle Based on Microprism Structures," Applied Physics Letters, 85(24):6016-6018(Dec. 2004).

Tagaya et al, "Thin Liquid-Crystal Display Backlight System with Highly Scattering Optical Transmission Polymers," Applied Optics, 40(34):6274-6280(Dec. 2001).

Davis, "Light Emitting Diode Source Modeling for Optical Design," Reflexite Display Optics(Oct. 2004).

Foley, "NE04-21: Microstructured Plastic Optics for Display, Lighting, and Telecommunications Applications," Fresnel Optics(2001).

"Microprism Technology for Liminaires," Reflexite Display Optics.

Davis, "Microstructured Optics for LED Applications," Reflexite Display Optics.

Alt et al, "A Gray-Scale Addressing Technique for Thin-Film-Transistor/Liquid Crystal Displays," IBM J. Res. Develop., 36(1):11-22(Jan. 1992).

Takatori et al, "6.3: Field-Sequential Smectic LCD with TFT Pixel Amplifier," SID 01 Digest, 48-51(2001).

Hartman, "4.1: Invited paper: Two-Terminal Devices Technologies for AMLCDs," SID 95 Digest, 7-10(1995).

Feenstra et al, "Electrowetting Displays," Liquavista BV, http://www.liquavista.com/documents/electrowetting_displays_whitepaper.pdf, Retrieved on Aug. 17, 2006.

Bozler et al, "Arrays of gated field-emitter cones having 0.32 μm tip-to-tip spacing," J. Vec. Sci. Technol. B, 12(2):629-632(Mar./Apr. 1994).

Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).

Liang et al, "Observation of electric field gradients near field-emission cathode arrays," Appl Phys. Lett., 66(9):1147-1149(Feb. 1995).

Kalantar, "Modulation of viewing angle on an LCD surface through backlight optics," Journal of the SID, 11(4):647-652(2003).

den Boer, "Active Matrix Liquid Crystal Displays," Elsevier Science & Technology Books, ISBN #0750678135, Aug. 2005.

* cited by examiner

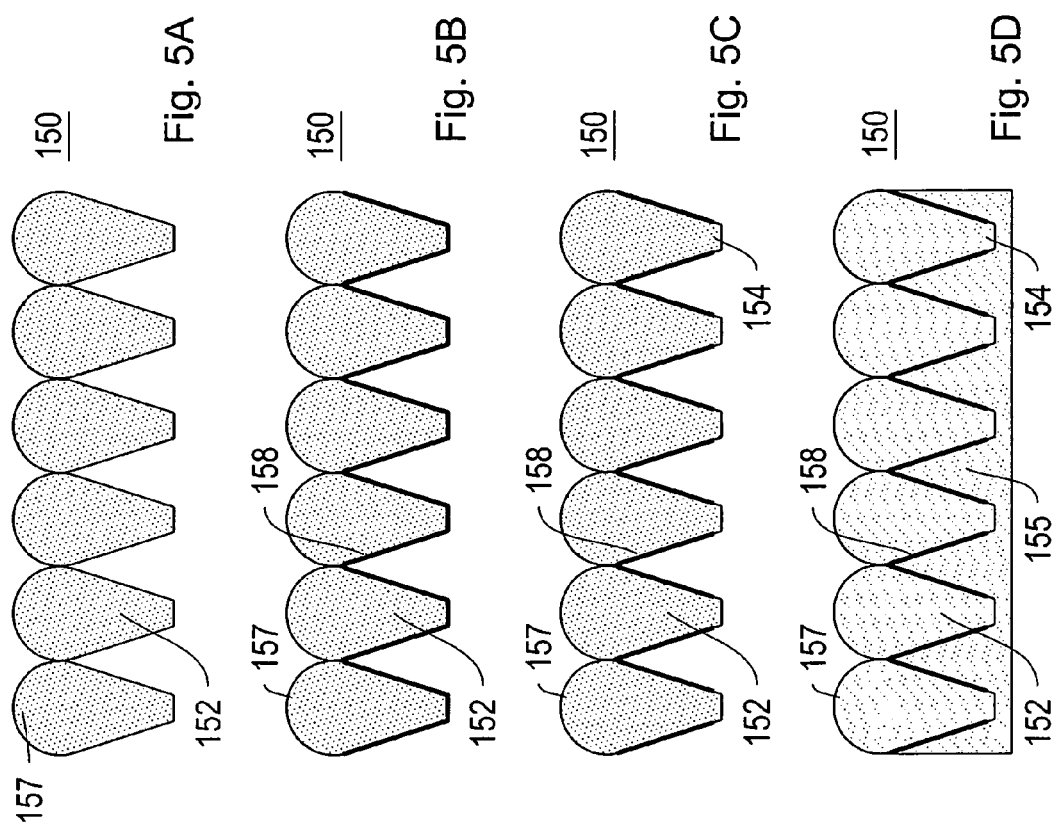

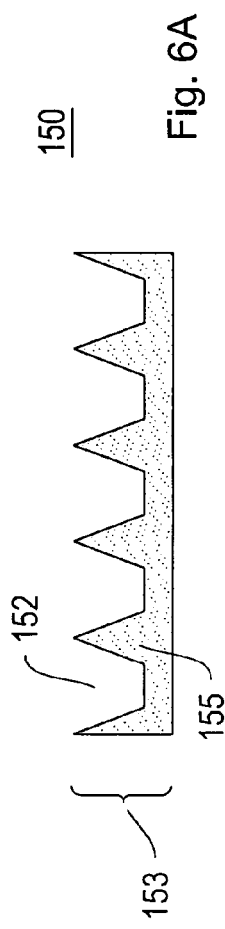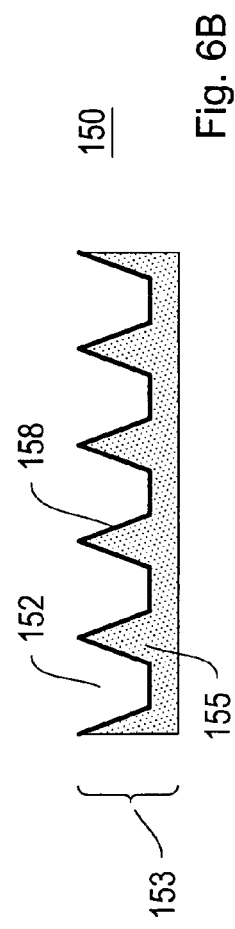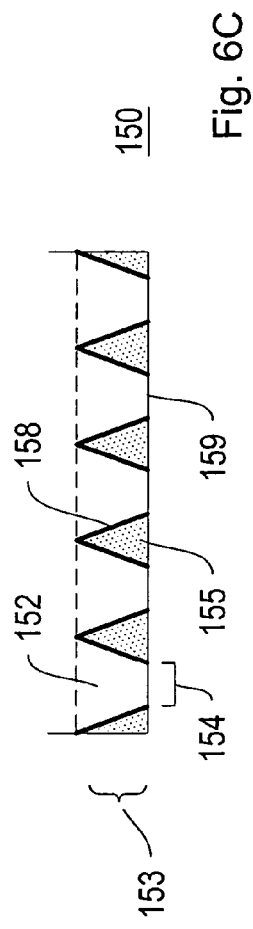

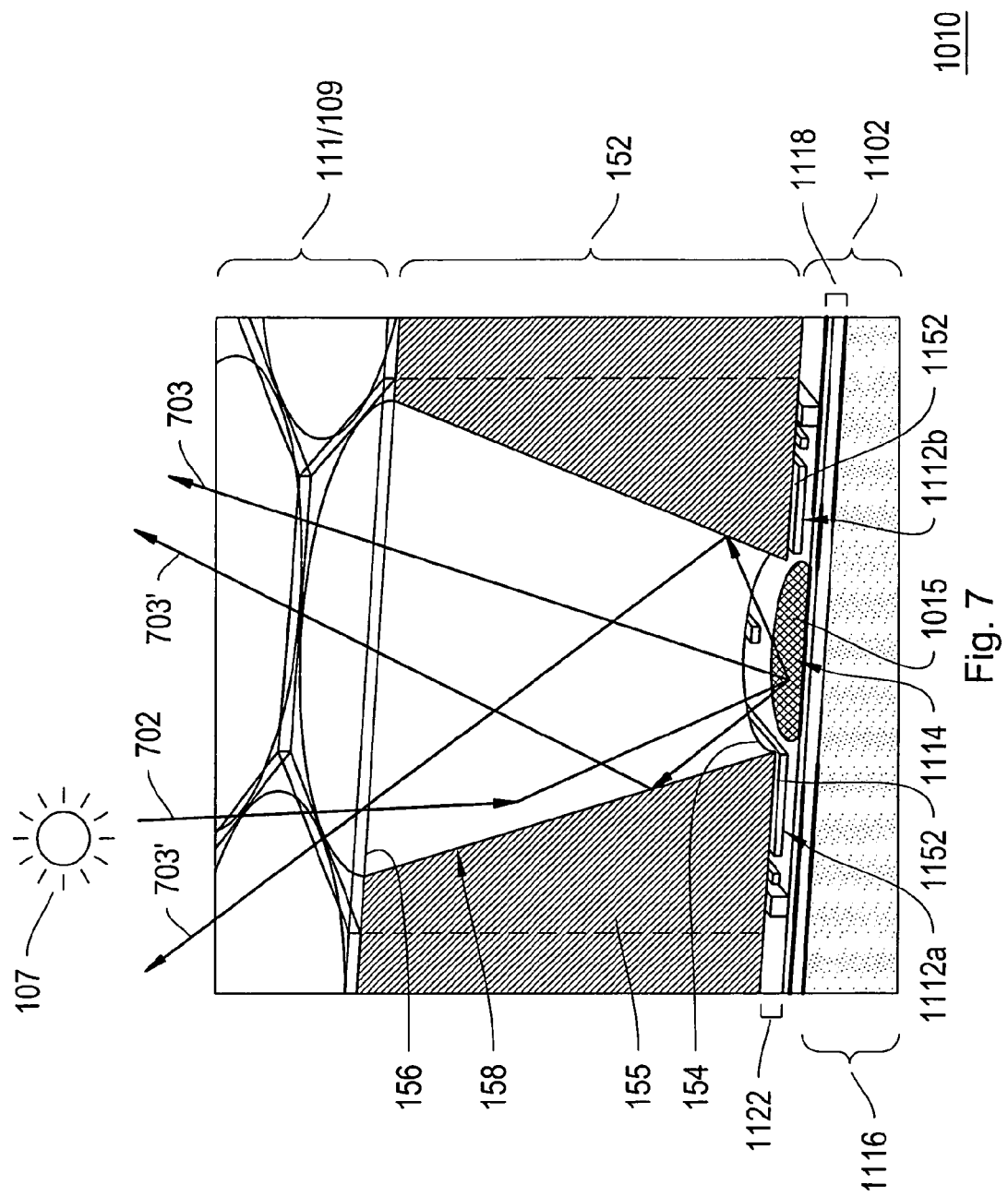

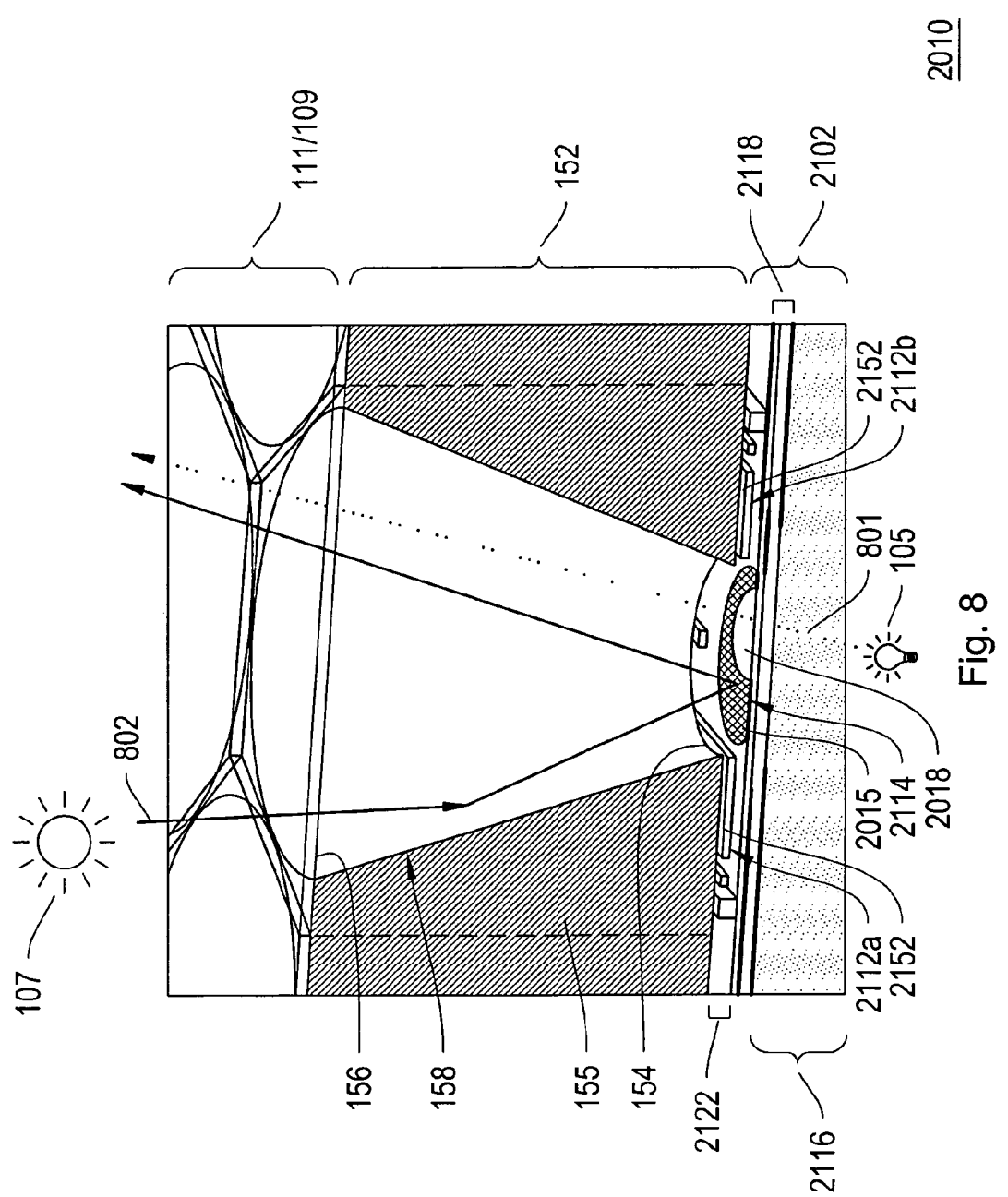

LIGHT CONCENTRATING REFLECTIVE DISPLAY METHODS AND APPARATUS

CROSS-REFERENCE TO RELATED APPLICATIONS

This application claims priority to and benefit of U.S. Provisional Patent Application No. 60/676,053, entitled "MEMS Based Optical Display" and filed on Apr. 29, 2005, and U.S. Provisional Patent Application No. 60/655,827, entitled "MEMS Based Display Modules" and filed on Feb. 23, 2005, each of which is hereby incorporated by reference herein in its entirety.

FIELD OF THE INVENTION

In general, the invention relates to the field of video displays, and in particular, the invention relates to displays having improved reflectivity.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications.

Besides projection-type applications, conventional displays are generally grouped into transmissive-type applications, reflective-type applications, and transflective-type applications. The transmissive-type display includes a lighting element, usually called a backlight, at a back surface of the display for transmitting light towards a viewer. Backlights consume a relatively large amount of power. On the other hand, the reflective-type display includes a reflector for reflecting ambient light towards a viewer. This does not require a backlight, and therefore reduces the amount of required power. However, in conventional reflective-type displays, the reflection of ambient light generally cannot produce a satisfactory contrast ratio ("CR") or brightness in some lighting situations.

However, with the recent development of portable apparatus, there is a significant increase in demand for power-saving display devices. Reflective, transmissive and transflective displays using mechanical light modulators have not yet demonstrated sufficiently attractive combinations of speed, brightness, and low power. There is a need in the art for fast, bright, low-powered, mechanically actuated reflective, transmissive, and transflective displays.

SUMMARY OF THE INVENTION

It is an object of this invention to provide apparatus and methods for displays that utilize an array of light concentrators for concentrating light onto or through a surface of mechanical light modulators to increase the contrast ratio and brightness of the display.

In one aspect, the invention relates to a display for displaying an image to a viewer. The display includes an array of light modulators and an array of reflective light funnels disposed between the array of light modulators and the viewer. The array of reflective light funnels concentrates light on respective ones of the light modulators in the array of light modulators. In one embodiment, the array of light modulators selectively reflects light towards the viewer to display the image. In another embodiment, the array of light modulators selectively modulates light towards the viewer to display the image.

In another aspect, the invention relates to a method of manufacturing a display by forming an array of reflective or transmissive light modulators. The method also includes forming an array of reflective light funnels by forming an array of depressions in a sheet of a substantially transparent material. Each depression has a top, a bottom, and a wall. Forming the array of reflective light funnels also includes depositing a reflective film on the walls of the depressions and forming optical openings at the bottom of the depressions, such that the optical openings have a diameter which is smaller than the diameter of the top of the depression. Alternately the array of reflective light funnels can be formed by forming an array of funnel shaped objects in a transparent material and coating the outside of the walls of the funnel shaped objects with a reflective film.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which:

FIGS. 5A-5D are partial cross-sectional views of the concentrator array layer of the display apparatus of FIGS. 1-4, at various stages of fabrication, according to an illustrative embodiment of the invention;

FIGS. 6A-6C are partial cross-sectional views of the concentrator array layer of the display apparatus of FIGS. 1-4, at various stages of fabrication, according to another illustrative embodiment of the invention;

FIG. 7 is a partial isometric cross-sectional view of an individual shutter and pixel assembly of the display apparatus of FIGS. 1-6C, according to an illustrative embodiment of the invention;

FIG. 8 is a partial isometric cross-sectional view of an individual shutter and pixel assembly of the display apparatus of FIGS. 1-7, implemented as a transflective-type display, according to an illustrative embodiment of the invention.

DETAILED DESCRIPTION OF THE INVENTION

To provide an overall understanding of the invention, certain illustrative embodiments will now be described, including apparatus and methods for displays with light concentration arrays. However, it will be understood by one of ordinary skill in the art that the systems and methods described herein may be adapted and modified as is appropriate for the application being addressed, that the systems and methods described herein may be employed in other suitable applications, and that such other additions and modifications will not depart from the scope hereof.

Figure 1:
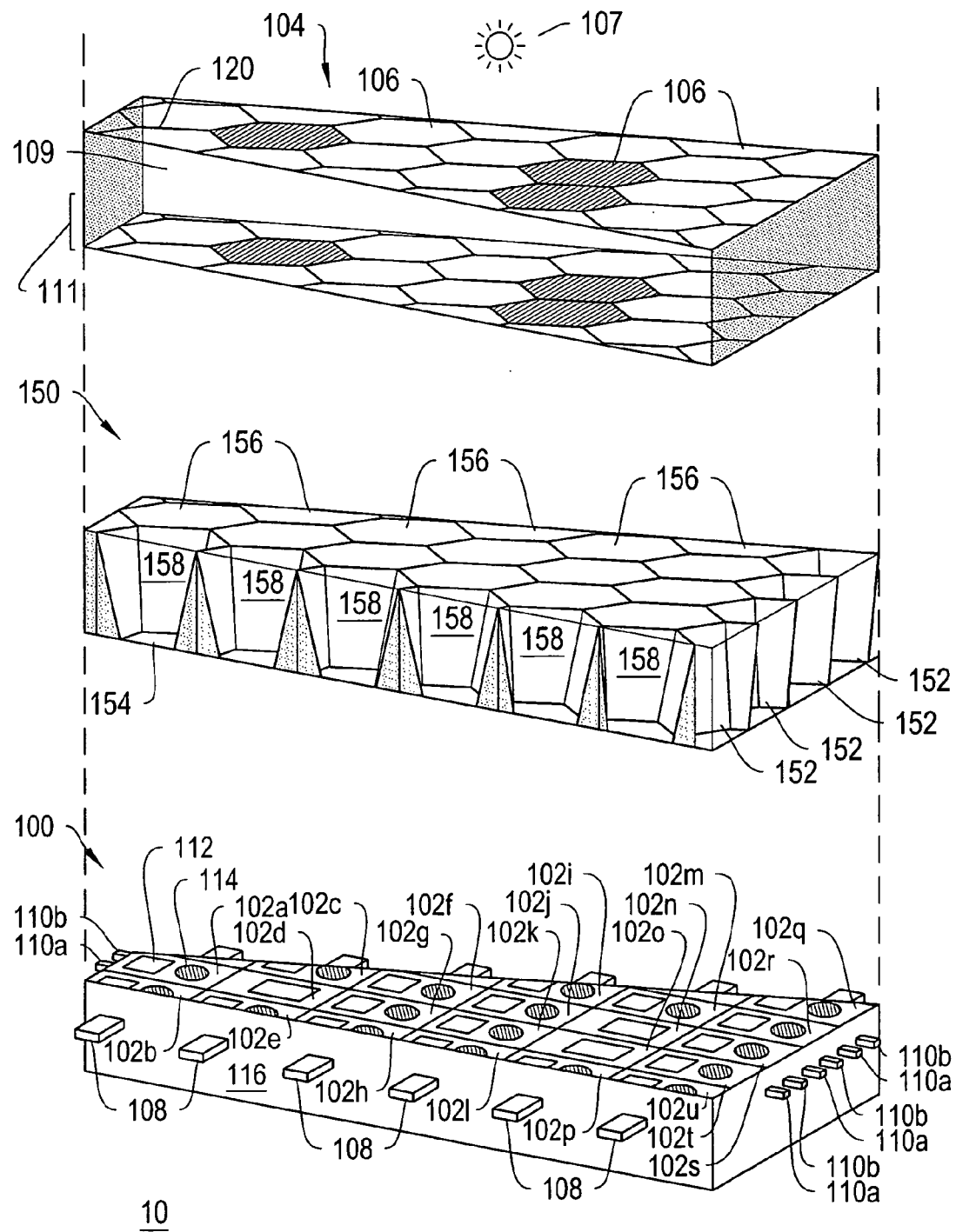
FIG. 1 is a conceptual isometric view of a display apparatus, according to an illustrative embodiment of the invention.

FIG. 1 is an isometric conceptual view of a reflective display apparatus 10 including an array 100 of light modulators (also referred to as a "light modulation array 100"), an array 150 of light concentrators (also referred to as a "light concentration array 150"), according to an illustrative embodiment of the invention. The display apparatus 10 can alternatively be formed as a transflective or transmissive display. Such embodiments are described further in relation to FIGS. 8 and 9. Light modulation array 100 includes a plurality of shutter assemblies 102a-102u (generally "shutter assemblies 102") arranged in rows and columns (although segmented displays without rows and columns can also be employed without departing from the spirit and scope of the invention). In general, a shutter assembly 102 has two states, open and closed (although partial openings can be employed to impart grey scale, for example, as will be described in greater detail below). Each shutter assembly 102 includes a shutter 112 for selectively covering a corresponding exposable surface 114. Shutter assemblies 102a-c, 102e-m, and 102p-u are in the open state, exposing their corresponding exposable surfaces 114 to light which has passed through the light concentration array 150. Shutter assemblies 102d, 102n, and 102o are in the closed state, obstructing light from impacting their corresponding exposable surfaces 114 passing through light concentration array 150. In general, apparatus 10 selectively sets the states of shutter assemblies 102 to reflect light beams originating from an ambient light source 107, on the same side of the array as the viewer, back towards surface 103 for forming image 104 (see, also, FIG. 7, for example). Alternatively, instead of being ambient to the apparatus 10, light source 107 could be provided as an integrated front light.

In one embodiment of the invention, each shutter assembly 102 of light modulation array 100 may correspond to an image pixel 106 in image 104. As described above, each shutter assembly 102 includes a shutter 112 and an exposable surface 114. In one implementation, the surface of the shutter 112 facing the light source 107 is reflective, and the exposable surface 114 is light-absorbing. To illuminate a pixel, the shutter 112 is at least partially closed to reflect light towards the surface 103. In an alternative implementation the surface of the shutter 112 facing the light source 107 absorbs light and the exposable surface 114 reflects light. In this implementation, a pixel 106 is brightest when the shutter 112 is fully open and darkest when the shutter 112 is fully closed.

In alternative implementations, display apparatus 10 may employ multiple shutter assemblies 102 for each image pixel 106. For example, the display apparatus may include three or four color-specific shutter assemblies 102 per image pixel 106. By selectively opening one or more of the color-specific shutter assemblies 102 corresponding to a particular image pixel 106, the display apparatus can generate a color image pixel 106 in image 104. In another example, display apparatus 10 may include shutter assemblies 102 that may provide for multiple partially open or closed states per image pixel 106 to provide grey scale in image 104.

Exposable surface 114 may be formed in various ways from films, depositions, or any other suitable materials, or combinations or lack thereof which either reflect or absorb light, depending on the desired implementation of the shutter assembly 102. Similarly, each shutter 112 may be provided with a surface that reflects light therefrom or absorbs light therein, such that in conjunction with its associated exposable surface 114, light is appropriately reflected or absorbed, towards the viewer by assembly 102, as desired. Such materials are described further in relation to FIG. 2. In still other implementations, display apparatus 10 may include other forms of light modulators, such as micromirrors, filters, polarizers, liquid crystal modulation cells, interferometric devices, and other suitable devices, instead of shutter assemblies 102 to modulate light to form an image.

Light concentration array 150 includes an array of optical elements for concentrating light onto respective light modulators in the array of light modulators 100 to increase the fraction of ambient light impacting on either the shutter 112 or exposable surface 114 depending on the position of the shutter 112. Various types of optical elements may be provided in light concentration array 150, including reflective light funnels, high numerical aperture lenses, and other non-imaging optical devices, for example. In the illustrative embodiment shown in FIG. 1, light concentration array 150 includes an array of reflective light funnels 152. Each funnel 152 is associated with a respective shutter assembly 102 for concentrating light emitted from ambient light source 107, onto a particular region of the shutter assembly 102 corresponding to the funnel 152. Each reflective funnel 152 preferably includes a first optical opening 156 directed towards the surface 103, a second optical opening 154 directed towards its associated shutter assembly 102, and a wall 158 connecting the first optical opening 156 to the second optical opening 154.

The first optical opening 156 is preferably sized to match the size of an associated pixel 106, and the second optical opening 154 is preferably sized to match or to be slightly smaller than the size of the exposable surface 114 of its associated shutter assembly 102. Wall 158 is preferably highly reflective and the first optical opening 156 is preferably larger than the second optical opening 154 such that, to the greatest extent possible, beams of ambient light originating from ambient light source 107 may enter funnel 152 at first optical opening 156 from a wide range of angles and be reflected through second optical opening 154 onto a concentrated region of shutter assembly 102. This increases the fraction of available image forming light which gets modulated by each shutter assembly 102, thereby improving the contrast ratio of display apparatus 10. Moreover, funneling and concentrating an increased fraction of ambient light 107 onto a reflective element or elements of shutter assembly 102, display apparatus 10 is able to provide an increased brightness and luminous efficiency while eliminating the need for a backlight and additional power.

Wall 158 may be straight, curved, CPC (Compound Parabolic Collector)-shaped or any suitable combination thereof that provides for an optically efficient concentration of ambient light 107 and which also yields a high fill factor. Wall 158 may be conical or may include multiple sides, depending on the size and shape of the funnel's optical openings. Optical openings 154 and 156 may be of various shapes and sizes without departing from the spirit and scope of the invention. Optical openings 156 could be hexagonal while optical openings 154 could be circular, for example. Wall 158 may be provided with a reflective interior surface or with a transparent interior surface and an exterior reflective coating (as described in more detail below with respect to FIGS. 5A-6C).

Figure 2:
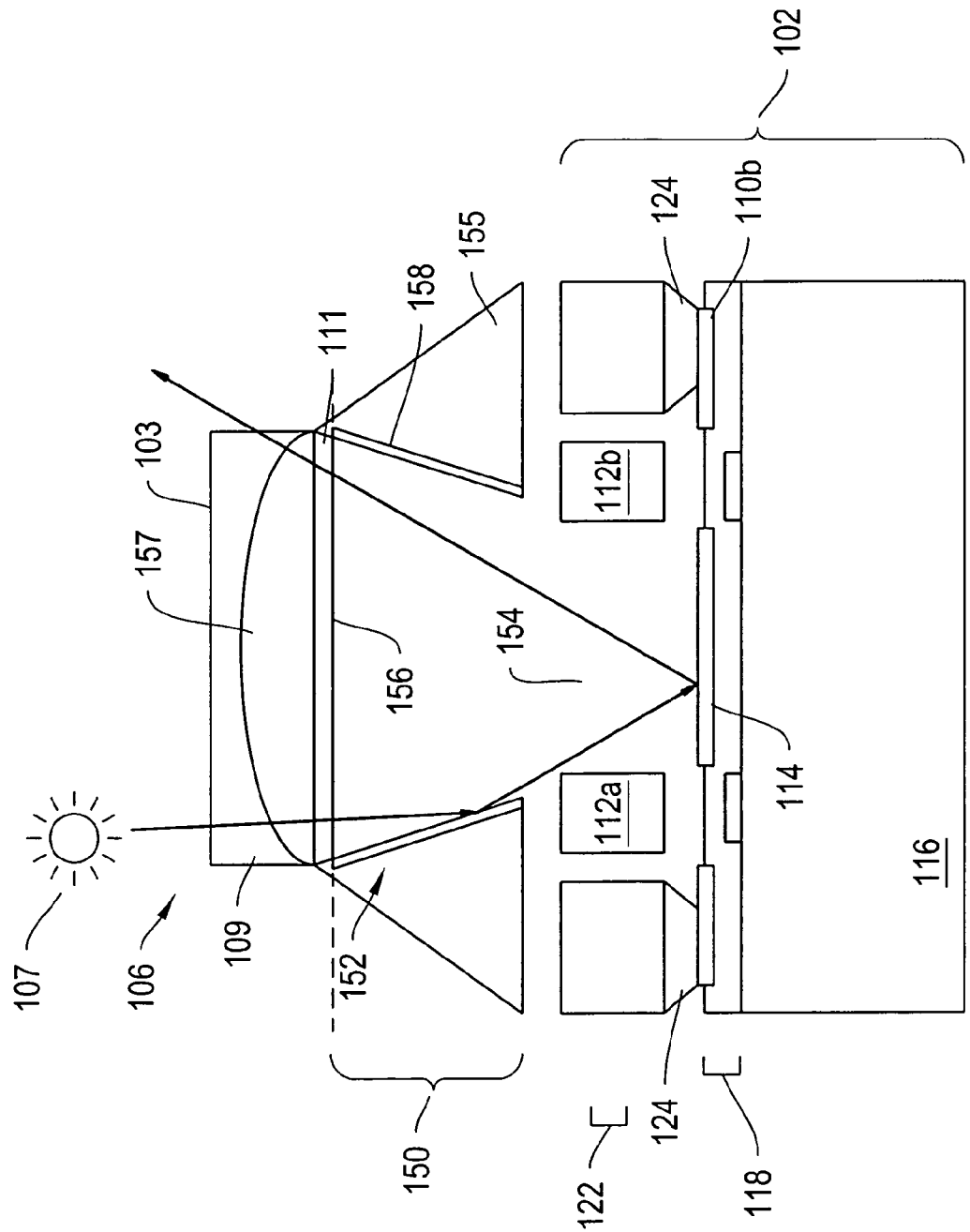
FIG. 2 is a partial cross-sectional view of an individual shutter and pixel assembly of the display apparatus of FIG. 1, according to an illustrative embodiment of the invention.

FIG. 2 is a cross-sectional diagram of one of the combined shutter-funnel assemblies of FIG. 1, illustrating additional features of the display apparatus 10. With reference to FIGS. 1 and 2, display apparatus 10 may also include a cover sheet 109 and a filter array layer 111 between the viewer and light concentration array 150. Cover sheet 109 serves several functions, including protecting the light modulation array 100 from mechanical and environmental damage. Cover sheet 109 may be a thin transparent plastic, such as polycarbonate, or a glass sheet, for example. In certain embodiments, the cover sheet can be coated and patterned with a light absorbing material, also referred to as a black matrix 120. The black matrix 120 can be deposited onto the cover sheet 109 as a thick film acrylic or vinyl resin that contains light absorbing pigments. Black matrix 120 may absorb certain incident ambient light, thereby increasing the contrast of the image 104 formed by apparatus 10. The black matrix 120 can also function to absorb light escaping in a leaky or time-continuous fashion. Top surface 103 of cover sheet 109 may display image 104 to the viewer.

In one implementation, filter array 111, which may be deposited on cover sheet 109, may include color filters, for example, in the form of acrylic or vinyl resins, or thin film dielectrics. The filters may be deposited in a fashion similar to that used to form black matrix 120, but instead, the filters are patterned over the first optical openings 156 or the second optical openings 154 of cones 152 of light concentration array 150 to provide appropriate color filters for color-specific shutter assemblies 102. For example, display apparatus 10 may include multiple groupings of three or more color-specific shutter assemblies 102 (e.g., a red shutter assembly, a green shutter assembly, and a blue shutter assembly; a red assembly, a green shutter assembly, and a blue shutter assembly, and a white shutter assembly; a cyan shutter assembly, a magenta shutter assembly, and a yellow shutter assembly, etc. although any other numerical and/or color combination of shutter assemblies for forming an image pixel may be provided without departing from the spirit and scope of the invention), such that each of the sub-pixels associated with the color-specific shutter assemblies 102 of a grouping may form an image pixel 106. There could be more than three color sub-pixels to make up one full image pixel. By selectively opening one or more of the color-specific shutter assemblies 102 in a grouping corresponding to a particular pixel, display apparatus 10 can generate an image pixel 106 of various colors for image 104.

These color filters can be made in several ways. For example, materials with selective absorptivity can be patterned onto the surface of the display using well known photolithographic techniques, similar to the steps used in fabricating the shutters and passive matrix or active matrix components of the control matrix. Materials with dispersed metals and metal oxides or more generally specific absorptive materials can be photosensitive and defined like a photoresist. Alternatively, such absorptive centers can be applied in a thin film form and subsequently patterned with well known photolithography and etch processes. Furthermore, thin films based on interference properties of the thin film layers can be patterned on the substrate for forming interference filters over the representative red, blue, and green pixels, for example. Color filter materials can also be formed from organic dyes dispersed in a resin, such as polyvinyl acrylate.

The height, thickness, shape, and diameters of the optical openings of funnels 152 can vary according to the materials employed and the application. When the height of wall 158 of funnel 152 is small compared to the difference in size between optical openings 154 and 156, the slope of wall 158 is relatively shallow (i.e., wall 158 is substantially parallel to surface 103), and funnel 152 generally acts like a retro-reflector by reflecting most of ambient light 107 back towards the viewer without first concentrating the light onto the reflective region or regions of shutter assembly 102. On the other hand, when the height of wall 158 of funnel 152 is large compared to the difference in size between optical openings 154 and 156, the slope of wall 158 is relatively steep (i.e., wall 158 is substantially perpendicular to surface 103), resulting in a significant loss of light intensity due to multiple reflections of beams of ambient light 107 off of wall 158. In a preferred embodiment, the diameter of first optical opening 156 can range from between 75 and 225 microns, and is preferably 150 microns; the diameter of second optical opening 154 can range from between 25 and 75 microns, and is preferably 50 microns; and the height of cone 152 can range from between 100 and 300 microns, and is preferably 200 microns, for example, yielding slopes ranging from about 3.5 to 4.

In addition, a lens array may be provided with lenses 157 for focusing incoming ambient light into a respective funnel 152, and thereby onto the associated shutter assembly 102, thereby reducing both the number of reflections off of wall 158 and the chance of retro-reflection paths (note that no lenses 157 are shown in FIG. 1 for the sake of clarity of the drawing). Lens 157 positioned at first optical opening 156 of funnel 152 may help direct and concentrate oblique incident light rays originating from ambient light source 107 into funnel 152 and thus onto the reflective region or regions of shutter assembly 102. Color filters of array 111 may be fixed to the bottom side of lenses 157, for example, as shown in FIG. 2. As shown in FIG. 5, the lens and optical funnel structures can be formed as one in a single molding process.

Color filtering can also be done at other locations in display apparatus 10. In addition to within the cover sheet 109, color filter array 111 may be applied at the second optical opening 154 of each reflective light funnel 152, for example. This embodiment may be especially preferable in the implementation where funnels 152 are filled with a hard transparent optical material (as described below in more detail with respect to FIGS. 5A-6C). Filter array 111 may alternatively be applied proximal to the reflective region or regions of shutter assembly 102. Generally, filters 111 of the filter array may be placed anywhere in the light path of a given pixel between surface 103 and the reflective surface of the shutter assembly 102.

Reflective wall 158 has a reflectivity above about 50%. For example, reflective wall 158 may have a reflectivity of 70%, 85%, 92%, 96%, or higher. Smoother substrates and finer grained metals yield higher reflectivities. Smooth surfaces may be obtained by molding plastic into smooth-walled forms. Fine grained metal films without inclusions can be formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Rh, Si, Mo, and/or any alloys or combinations thereof.

Alternatively, reflective wall 158 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel interfaces, it is possible to produce a net reflective surface having a reflectivity exceeding 98%. Some dielectric mirrors have reflectivities greater than 99.8%. Dielectric mirrors can be custom-designed to accept a pre-specified range of wavelengths in the visible range and to accept a pre-specified range of incident angles. Reflectivities in excess of 99% under these conditions are possible as long as the fabricator is able to control the smoothness in the dielectric film stacks. The stacks can include between about 20 and about 500 films, for example.

As similarly described in co-pending, commonly assigned U.S. patent application Ser. No. 11/218,690, entitled "Methods and Apparatus for Spatial Light Modulation" and issued as U.S. Pat. No. 7,417,782 on Aug. 26, 2008, the entire disclosure of which is hereby incorporated herein by reference, the state of each shutter assembly 102 can be controlled using a passive matrix addressing scheme. Each shutter assembly 102 may be controlled by a column electrode 108 and two row electrodes 110a (a "row open electrode") and 110b (a "row close electrode"). In light modulation array 100, all shutter assemblies 102 in a given column may share a single column electrode 108. All shutter assemblies in a row may share a common row open electrode 110a and a common row close electrode 110b.

An active matrix addressing scheme is also possible. Active matrix addressing (in which pixel and switching voltages are controlled by means of a thin film transistor array or an array of metal insulator metal ("MIM") diodes) is useful in situations in which the applied voltage must be maintained in a stable fashion throughout the period of a video frame. An implementation with active matrix addressing can be constructed with only one row electrode per shutter assembly row. Additional addressing circuit devices are described in co-pending, commonly assigned U.S. patent application Ser. No. 11/326,696, entitled "Display Methods and Apparatus" and published as U.S. Patent Application Publication No. 20060250325 on Nov. 9, 2006, the entire disclosure of which is hereby incorporated herein by reference.

Referring to FIGS. 1 and 2, shutter assembly 102 is built on a glass, silicon, or plastic polymer substrate 116, which is shared with other shutter assemblies 102 of light modulation array 100. Substrate 116 may support as many as 4,000,000 shutter assemblies, arranged in up to about 2,000 rows and up to about 2,000 columns. A plurality of substrates may be arranged in an array for signage applications, for example.

Light modulation array 100 and its component shutter assemblies 102 are formed using standard micromachining techniques known in the art, including lithography; etching techniques, such as wet chemical, dry, and photoresist removal; thermal oxidation of silicon; electroplating and electroless plating; diffusion processes, such as boron, phosphorus, arsenic, and antimony diffusion; ion implantation; film deposition, such as evaporation (filament, electron beam, flash, and shadowing and step coverage), sputtering, chemical vapor deposition ("CVD"), epitaxy (vapor phase, liquid phase, and molecular beam), electroplating, screen printing, and lamination. See generally, Jaeger, Introduction to Microelectronic Fabrication (Addison-Wesley Publishing Co., Reading Mass., 1988); Runyan, et al., Semiconductor Integrated Circuit Processing Technology (Addison-Wesley Publishing Co., Reading Mass., 1990); Proceedings of the IEEE Micro Electro Mechanical Systems Conference, 1987-1998; and Rai-Choudhury, ed., Handbook of Microlithography, Micromachining & Microfabrication (SPIE Optical Engineering Press, Bellingham, Wash., 1997), each of which is hereby incorporated by reference herein in its entirety.

More specifically, multiple layers of material (typically alternating between metals and dielectrics) may be deposited on top of a substrate forming a stack. After one or more layers of material are added to the stack, patterns may be applied to a top most layer of the stack marking material either to be removed from, or to remain on, the stack. Various etching techniques, including wet and/or dry etches, may then be applied to the patterned stack to remove unwanted material. The etch process may remove material from one or more layers of the stack based on the chemistry of the etch, the layers in the stack, and the amount of time the etch is applied. The manufacturing process may include multiple iterations of layering, patterning, and etching.

The process may also include a release step. To provide freedom for parts to move in the resulting device, sacrificial material may be interdisposed in the stack proximate to material that will form moving parts in the completed device. An etch or other fugitive phase process removes much of the sacrificial material, thereby freeing the parts to move.

After release, the surfaces of the moving shutter may be insulated so that charge does not transfer between moving parts upon contact. This can be accomplished by thermal oxidation and/or by conformal chemical vapor deposition of an insulator such as $Al_2O_3$, $Cr_2O_3$, $TiO_2$, $HfO_2$, $V_2O_5$, $Nb_2O_5$, $Ta_2O_5$, $SiO_2$, or $Si_3N_4$, or by depositing similar materials using techniques such as atomic layer deposition. The insulated surfaces may be chemically passivated to prevent problems such as friction between surfaces in contact by chemical conversion processes such as fluoridation or hydrogenation of the insulated surfaces.

As similarly described in co-pending, commonly assigned U.S. patent application Ser. No. 11/251,035, entitled "Methods and Apparatus for Actuating Displays" and issued as U.S. Patent No. 7,271,945 on Sep. 18, 2007, the entire disclosure of which is hereby incorporated herein by reference, dual compliant electrode actuators make up one suitable class of actuators for driving shutters 112 in shutter assemblies 102. It is to be noted that many other various types of actuators, including non-dual compliant electrode actuators, may be utilized for driving shutters 112 in shutter assemblies 102 without departing from the spirit and scope of the invention. A dual compliant beam electrode actuator, in general, is formed from two or more at least partially compliant beams. At least two of the beams serve as electrodes (also referred to herein as "beam electrodes"). In response to applying a voltage across the beam electrodes, the beam electrodes are attracted to one another from the resultant electrostatic forces. Both beams in a dual compliant beam electrode are, at least in part, compliant. That is, at least some portion of each of the beams can flex and or bend to aid in the beams being brought together. In some implementations the compliance is achieved by the inclusion of corrugated flexures or pin joints. Some portion of the beams may be substantially rigid or fixed in place. Preferably, at least the majority of the length of the beams are compliant.

Dual compliant electrode actuators have advantages over other actuators known in the art. Electrostatic comb drives are well suited for actuating over relatively long distances, but can generate only relatively weak forces. Parallel plate or parallel beam actuators can generate relatively large forces but require small gaps between the parallel plates or beams and therefore only actuate over relatively small distances. R. Legtenberg et. al. (*Journal of Microelectromechanical Systems* v.6, p. 257, 1997) demonstrated how the use of curved electrode actuators can generate relatively large forces and result in relatively large displacements. The voltages required to initiate actuation in Legtenberg, however, are still substantial. As shown herein such voltages can be reduced by allowing for the movement or flexure of both electrodes.

In a dual compliant beam electrode actuator-based shutter assembly, a shutter is coupled to at least one beam of a dual compliant beam electrode actuator. As one of the beams in the actuator is pulled towards the other, the pulled beam moves the shutter, too. In doing so, the shutter is moved from a first position to a second position. In one of the positions, the shutter interacts with light in an optical path by, for example, and without limitation, blocking, reflecting, absorbing, filtering, polarizing, diffracting, or otherwise altering a property or path of the light. The shutter may be coated with a reflective or light absorbing film to improve its interferential properties. The exposable surface 114 interacts with the light in the optical path by, for example, and without limitation, blocking, reflecting, absorbing, filtering, polarizing, diffracting, or otherwise altering a property or path of the light, in a fashion that is complimentary to that of the optical effect provided by the shutter. For example, if one is absorbing the other is reflective or if one polarizes in one orientation the other surface polarizes in a perpendicular orientation.

Figure 3A:
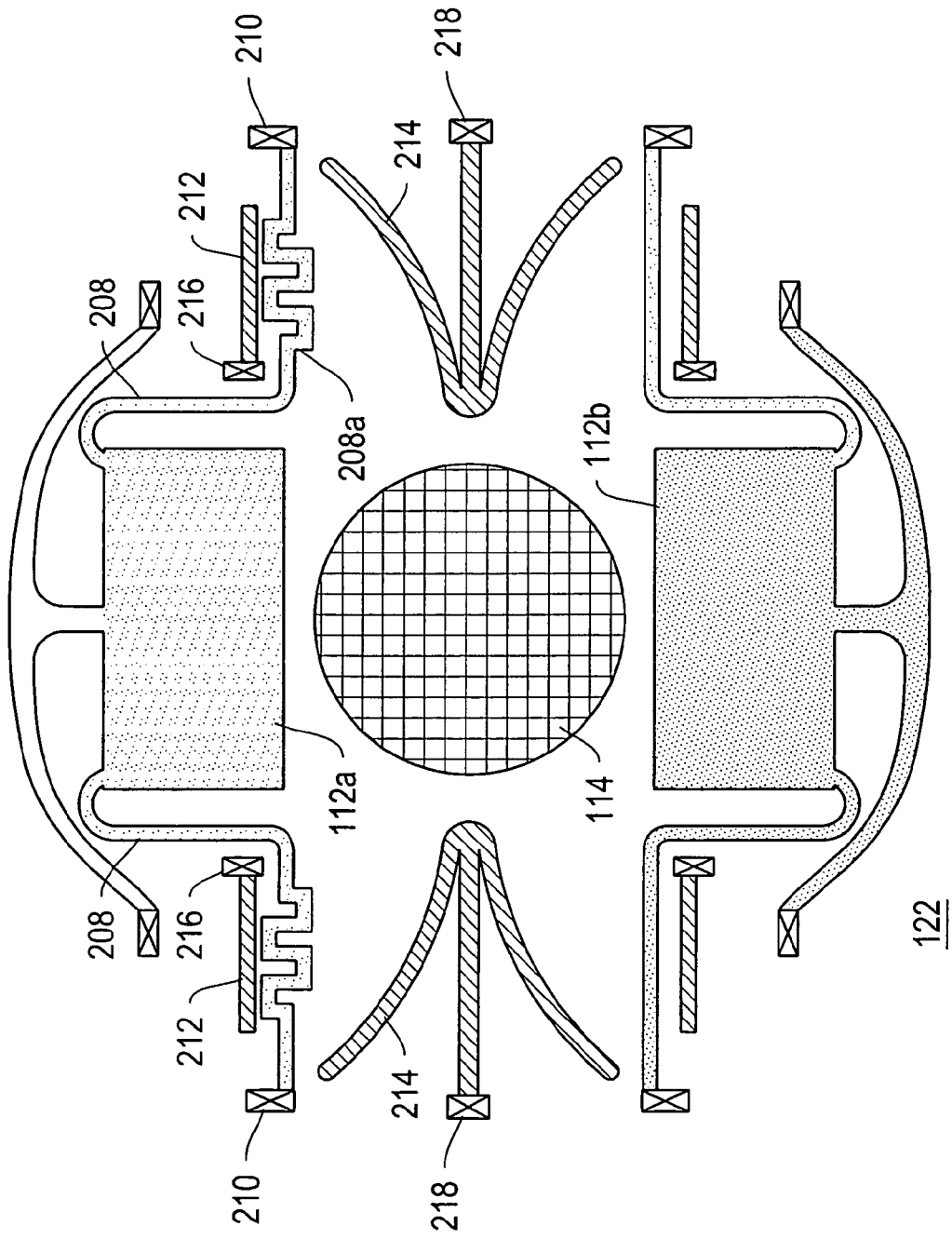
FIGS. 3A and 3B are top views of a shutter layer of the display apparatus of FIGS. 1 and 2, at various states of actuation, according to an illustrative embodiment of the invention.
Figure 3B:
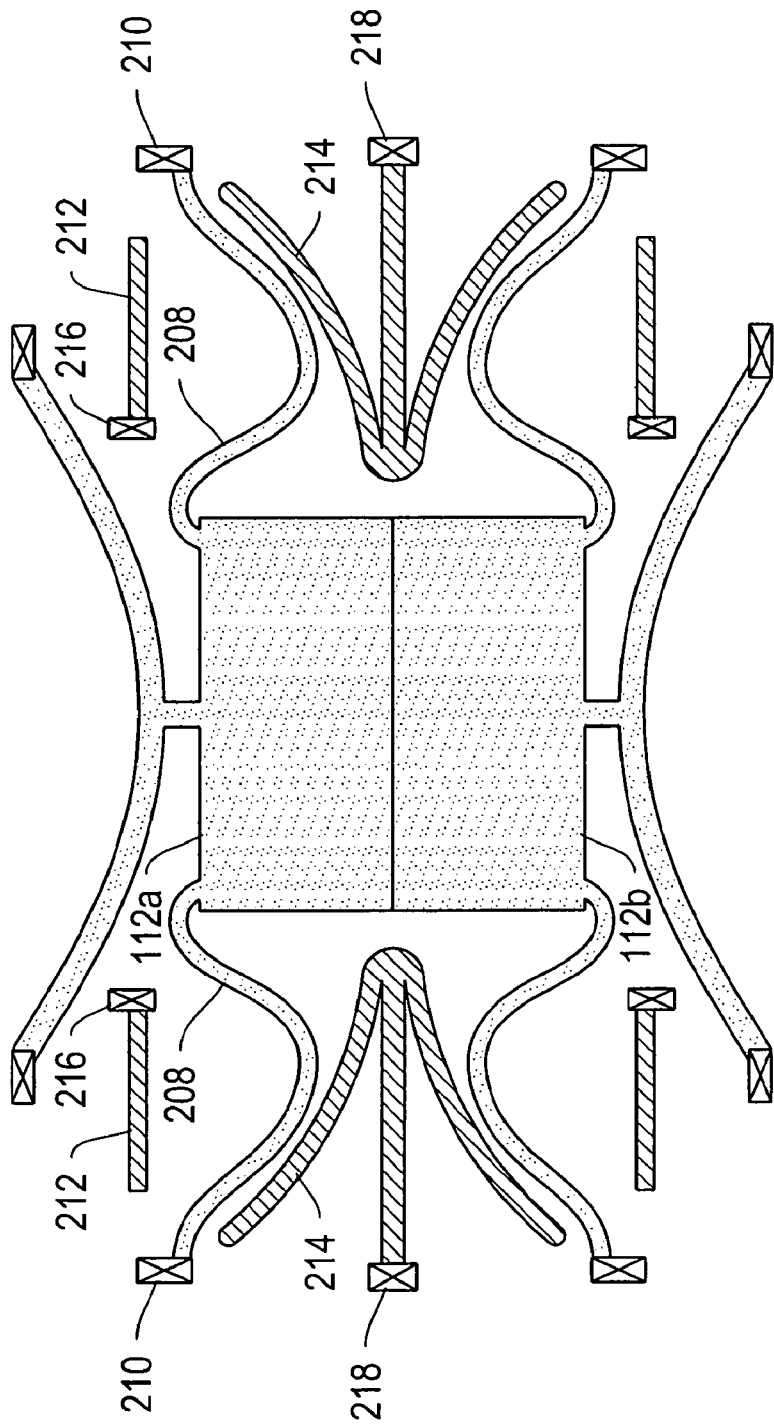

FIGS. 3A and 3B are plane views of a shutter assembly 102, in fully open and closed states, respectively, according to an illustrative embodiment of the invention. The shutter assembly 102 utilizes a dual compliant beam electrode actuators for actuation. Referring to FIGS. 2, 3A, and 3B, shutter assembly 102 modulates light to form an image by controllably moving a shutter 112, which includes two half-obstructing shutter portions 112a and 112b, in and out of an optical path of light between the viewer and exposable surface 114. Shutter portions 112a and 112b, when closed, substantially obstruct light from impacting the exposable surface 114. In one embodiment, instead of the shutter portions 112a and 112b being of about equal size, one shutter portion 112a or 112b is larger than that of the other shutter portion 112a or 112b, and they can be actuated independently. Thus by selectively opening zero, one, or both shutter portions 112a and 112, the shutter assembly 102 can provide for 4 levels of gray scale (e.g., off, one-third one, two-thirds on, and fully on).

Shutters 112a and 112b are each formed from a solid, substantially planar, body Shutters 112a and 112b can take virtually any shape, either regular or irregular, such that in a closed position shutters 112a and 112b sufficiently obstruct the optical path to exposable surface 114. In addition, shutters 112a and 112b must have a width consistent with the width of the exposable surface, such that, in the open position (as depicted in FIG. 3A), sufficient light can be absorbed or reflected by exposable surface 114 to darken or illuminate a pixel, respectively.

As shown in FIGS. 3A and 3B, each of shutters 112a and 112b (shutter 112) couples to an end of each of two load beams 208. A load anchor 210, at the opposite end of each load beam 208 physically connects the load beam 208 to substrate 122 and electrically connects the load beam 208 to driver circuitry formed on the substrate. Together, the load beams 208 and load anchors 210 serve as a mechanical support for supporting the shutter 112 over the exposable surface 114, formed on the substrate.

The shutter assembly 102 includes a pair of drive beams 212 and a pair of drive beams 214, one of each located along either side of each load beam 210. Together, the drive beams 212 and 214 and the load beams 210 form an actuator. Drive beams 212 serve as shutter open electrodes and the other drive beams 214 serve as shutter close electrodes. Drive anchors 216 and 218 located at the ends of the drive beams 212 and 214 closest to the shutter 112 physically and electrically connect each drive beam 212 and 214 to circuitry formed or the substrate 122. In this embodiment, the other ends and most of the lengths of the drive beams 212 and 214 remain unanchored or free to move.

The load beams 208 and the drive beams 212 and 214 are compliant. That is, they have sufficient flexibility and resiliency such that they can be bent out of their unstressed ("rest") position or shape to at least some useful degree, without any significant fatigue or fracture. As the load beams 208 and the drive beams 212 and 214 are anchored only at one end, the majority of the lengths of the beams 208, 212, and 214 is free to move, bend, flex, or deform in response to an applied force. Corrugations (e.g., corrugations 208a on beams 208) may be provided to overcome axial stress due to foreshortening of the flexure and to provide higher deflections at a given voltage, for example.

Display apparatus 10 actuates shutter assembly 102 (i.e., changes the state of the shutter assembly 102) by applying an electric potential, from a controllable voltage source, to drive beams 212 or 214 via their corresponding drive anchors 216 or 218, with the load beams 208 being electrically coupled to ground or some different potential, resulting in a voltage across the beams 208, 212, and 214. The controllable voltage source, such as a passive or active matrix array driver, is electrically coupled to load beams 208 via a passive or active matrix array as described in U.S. Patent Application Publication No. 20060250325, referred to above. The display apparatus 10 may additionally or alternatively apply a potential to the load beams 208 via the load anchors 210 of the shutter assembly 102 to increase the voltage. An electrical potential difference between the drive beams 212 or 214 and the load beams 208, regardless of sign or ground potential, will generate an electrostatic force between the beams which results in shutter movement transverse in the plane of motion.

The tiling or pixel arrangements for shutter assemblies need not be limited to the constraints of a square array. Dense tiling can also be achieved using rectangular, rhombohedral, or hexagonal arrays of pixels, for example, all of which find applications in video and color imaging displays.

Figure 4:
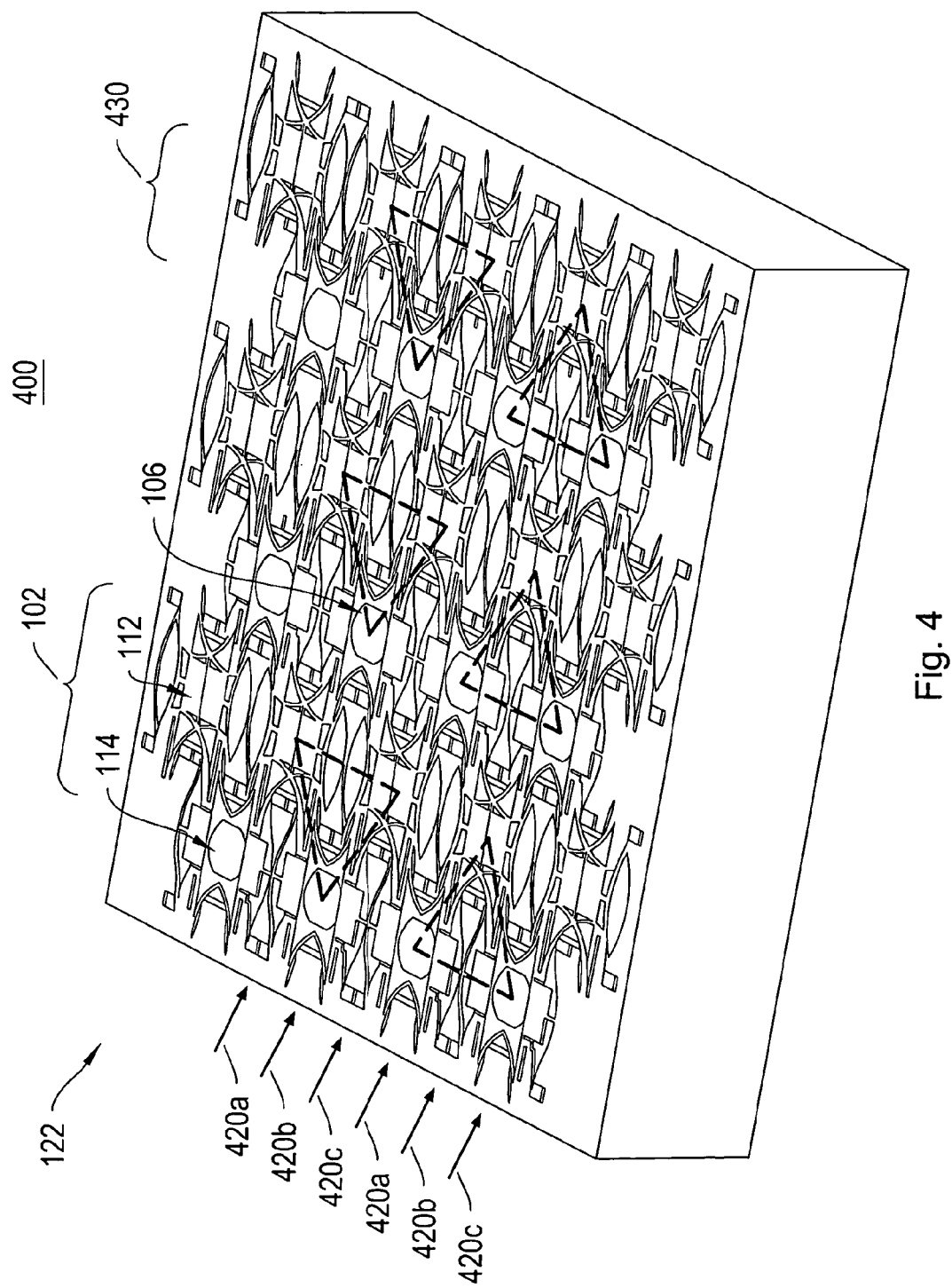
FIG. 4 is an isometric view, similar to that of FIG. 1, of the shutter layer of the display apparatus of FIGS. 1-3, showing a conceptual tiling diagram for arranging the shutter assemblies in the display apparatus, according to an illustrative embodiment of the invention.

FIG. 4 demonstrates a preferred method of tiling shutter assemblies into an array of pixels to maximize the aperture ratios in dense arrays and minimize the drive voltages. FIG. 4 depicts a tiling 400 of dual compliant zipper electrode actuator-based shutter assemblies 102 that are tiled on the substrate 122 to form image pixels 106 from three generally rectangular shutter assemblies 102. The three shutter assemblies 102 of each pixel 106 may be independently or collectively controlled.

Preferably shutter assemblies 102 are packed close together with as little dead area therebetween as possible to provide an increased fill factor. As shown in FIG. 4, portions of shutter assemblies 102 can be interleaved with the gaps between portions of neighboring shutter assemblies 102. The interleaved arrangement of tiling 400 can be mapped onto a square arrangement of rows and columns, if desired. As shown, a repeating sequence of columns 420a, 420b, and 420c may each be associated with sub-pixels having a specifically colored filter 111 (e.g., red, green, and blue, respectively). Also, two interleaved rows of shutter assemblies 102 are included in a single row electrode 430. The interleaving can be utilized to provide for hexagonal packing of the pixels 106.

In other alternate implementations, the display apparatus 102 can include multiple (for example, between 1 and 10) with corresponding exposable surfaces 114 and corresponding shutters 112 per image pixel 106. In changing the state of such an image pixel 106, the number of actuators activated can depend on the switching voltage that is applied or on the particular combination of row and column electrodes that are chosen for receipt of a switching voltage. Implementations are also possible in which partial openings of an aperture are made possible in an analog fashion by providing switching voltages partway between a minimum and a maximum switching voltage. These alternative implementations provide an improved means of generating a spatial grey scale, for example.

Funnels 152 of light concentration array 150 may be micro-molded, embossed, or investment casted from a very large family of polymers like acrylics, imides, and acetates, for example, as well as plastics, glass, or UV curing epoxies. Micro-molding may include subtractive techniques, such as photolithography, and etching or embossing techniques in which the inverse pattern is made in a hard material and subsequently aligned with and pressed into a soft material on the surface that can subsequently be cured or hardened. Alternatively, funnels 152 may be fabricated, for example, out of photo-imageable material, such as Novalac or PMMA or Polyimide amongst many polymers that can be cross-linked, or whose cross-links can be broken, with the aid of light. See, for example, "Plastic vs. Glass Optics: Factors to Consider (part of SPIE 'Precision Plastic Optics' short course note)," of Nov. 17, 1998, by Alex Ning, Ph.d.; "Micro Investment Molding: Method for Creating Injection Molded Hollow Parts," Proceedings of IMECE2005, of Nov. 5-11, 2005, by Julian M. Lippmann et al.; and "In-Plane, Hollow Microneedles Via Polymer Investment Molding, of 2005, by Julian M. Lippmann et al., each of which is hereby incorporated by reference herein in its entirety.

In one embodiment, referring to FIGS. 5A-5D, an array 150 of funnels 152 may be formed first by molding solid cones 152 and optional lens structures 157 out of polycarbonate, polymethylmethacrylate, silicone based polymers ("PDMS"), or polyimide, or any other suitable material, for example (see, e.g., FIG. 5A). Then a reflective layer may be coated onto the external and bottom surface of each cone 152 (see, e.g., FIG. 5B), preferably from the underside of array 150, for forming reflective wall 158. Next, the reflective layer coated on the bottom of cones 152 is polished off to provide for second optical opening 154 of each cone (see, e.g., FIG. 5C). Optionally, polycarbonate, polymethylmethacrylate, silicone based polymers ("PDMS"), or polyimide, or any other suitable material, for example, may be provided as a backfill 155 between cones 152 such that they are formed into a single filled sheet (see, e.g., FIG. 5D). In the embodiment where cones 152, lenses 157, and cover sheet 109 are all formed in one layer, filter arrays 111 may be provided at second optical opening 154 of each cone 152, for example.

Alternatively, in another embodiment, referring to FIGS. 6A-6C, an array of depressions, in the form of hollow funnels 152 can be formed, for example, in a sheet 153 of photo-imageable material 155, such as Novalac or PMMA or Polyimide amongst many polymers, for example (see, e.g., FIG. 6A). Then a reflective material may be coated onto the inside of each depression to form reflective wall 158 (see, e.g., FIG. 6B). Next, the bottom of the sheet 153 may be polished off to form an optical opening, the second optical opening 154, at the bottom of the hollow funnels 152 (see, e.g., FIG. 6C). Finally, and optionally, polycarbonate, polymethylmethacrylate, silicone based polymers ("PDMS"), or polyimide, or any other suitable material, for example, may be provided as a backfill 159 within cones 152 such that they are formed into a single filled sheet (see, e.g., FIG. 6D). In an alternative implementation of this method, the depressions are punched through the entirety of the sheet 153, preventing reflective material from collecting at the tip of the hollow funnels 152, thereby obviating the need to remove any material to form the second optical opening 154.

FIG. 7 is a partial isometric cross-sectional diagram, of one of the combined shutter, funnel, and pixel assemblies of FIG. 1, illustrating additional features of the display apparatus 10 when the apparatus is implemented as a reflective-type display apparatus 1010, according to an illustrative embodiment of the invention. Reflective display apparatus 1010 can be used with a reflective light modulation array including an array of reflective shutter assemblies 1102. Reflective shutter assembly 1102 reflects ambient light (e.g., typical ambient light beam 702) originating from ambient light source 107 towards a viewer through filter array layer 111 and cover sheet 109 (note that portions of layer 111 and sheet 109, including lens 157 are not shown in FIG. 7 for the sake of simplicity of the drawing).

Reflective shutter assembly 1102 can take substantially the same form as shutter assembly 102 of FIGS. 1-4. The frontmost layer of reflective shutter assembly 1102 facing the viewer, including at least the front surface of shutters 1112a and 1112b, is coated in a light absorbing film 1152. Thus, when shutter 1112 is closed, light 702 concentrated by funnel 152 on reflective shutter assembly 1102 is absorbed by film 1152. When shutter 1112 is at least partially open (as depicted in FIG. 7), at least a fraction of the light 702 concentrated on reflective shutter assembly 1102 reflects off an exposed reflective surface 1015 (i.e., exposable surface 1114) of layer 1118 back towards the viewer through funnel 152 as specular beams 703. Reflective surface 1015 has a reflectivity above about 50%. For example, reflective surface 1015 may have a reflectivity of 70%, 85%, 92%, 96%, or higher. Smoother substrates and finer grained metals yield higher reflectivities. Smooth surfaces may be obtained by molding plastic into smooth-walled forms. Fine grained metal films without inclusions can be formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Rh, Si, Mo, and/or any alloys or combinations thereof.

Alternatively, reflective surface 1015 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel interfaces, it is possible to produce a net reflective surface having a reflectivity exceeding 98%. Some dielectric mirrors have reflectivities greater than 99.8%. Dielectric mirrors can be custom-designed to accept a pre-specified range of wavelengths in the visible range and to accept a pre-specified range of incident angles. Reflectivities in excess of 99% under these conditions are possible as long as the fabricator is able to control the smoothness in the dielectric film stacks. The stacks can include between about 20 and about 500 films, for example. Alternately layer 1118 can be covered with an absorptive film while the front surface of shutter 1112 can be covered in a reflective film. In this fashion, light is reflected back to the viewer through funnel 152 only when shutter 1112 is at least partially closed.

Reflective surface 1015 may be roughened in order to provide diffusiveness thereon for combating glare. This roughening can be done by any one of several processes, including mechanical, chemical, or deposition processes. Roughening the reflective surface causes reflected light to be scattered at various angles into funnel 152, and thus at various angles towards the viewer as diffuse beams 703', thereby creating wider viewing angles and increasing the ratio of diffuse (Lambertian) to specular reflections.

The absorbing film 1152 can be formed, for example from a metal film. Most metal films absorb a certain fraction of light and reflect the rest. Some metal alloys which are effective at absorbing light, include, without limitation, MoCr, MoW, MoTi, MoTa, TiW, and TiCr. Metal films formed from the above alloys or simple metals, such as Ni and Cr with rough surfaces can also be effective at absorbing light. Such films can be produced by sputter deposition in high gas pressures (sputtering atmospheres in excess of 20 mtorr). Rough metal films can also be formed by the liquid spray or plasma spray application of a dispersion of metal particles, following by a thermal sintering step. A dielectric layer such as a dielectric layer 404 is then added to prevent spalling or flaking of the metal particles.

Semiconductor materials, such as amorphous or polycrystalline Si, Ge, CdTe, InGaAs, colloidal graphite (carbon) and alloys such as SiGe are also effective at absorbing light. These materials can be deposited in films having thicknesses in excess of 500 nm to prevent any transmission of light through the thin film. Metal oxides or nitrides can also be effective at absorbing light, including without limitation CuO, NiO, Cr2O3, AgO, SnO, ZnO, TiO, Ta2O5, MoO3, CrN, TiN, or TaN. The absorption of these oxides or nitrides improves if the oxides are prepared or deposited in non-stoichiometric fashion—often by sputtering or evaporation—especially if the deposition process results in a deficit of oxygen in the lattice. As with semiconductors, the metal oxides should be deposited to thicknesses in excess of 500 nm to prevent transmission of light through the film.

A class of materials, called cermets, is also effective at absorbing light. Cermets are typically composites of small metal particles suspended in an oxide or nitride matrix. Examples include Cr particles in a Cr2O3 matrix or Cr particles in an SiO2 matrix. Other metal particles suspended in the matrix can be Ni, Ti, Au, Ag, Mo, Nb, and carbon. Other matrix materials include TiO2, Ta2O5, Al2O3, and Si3N4.

It is possible to create multi-layer absorbing structures using destructive interference of light between suitable thin film materials. A typical implementation would involve a partially reflecting layer of an oxide or nitride along with a metal of suitable reflectivity. The oxide can be a metal oxide e.g. CrO2, TiO2, Al2O3 or SiO2 or a nitride like Si3N4 and the metal can be suitable metals such as Cr, Mo, Al, Ta, Ti. In one implementation, for absorption of light entering from the substrate a thin layer, ranging from 10-500 nm of metal oxide is deposited first on the surface of substrate 402 followed by a 10-500 nm thick metal layer. In another implementation, for absorption of light entering from the direction opposite of the substrate, the metal layer is deposited first followed by deposition of the metal oxide. In both cases the absorptivity of bi-layer stack can be optimized if the thickness of the oxide layer is chosen to be substantially equal to one quarter of 0.55 microns divided by the refractive index of the oxide layer.

In another implementation, a metal layer is deposited on a substrate followed by a suitable oxide layer of calculated thickness. Then, a thin layer of metal is deposited on top of the oxide such that the thin metal is only partially reflecting (thicknesses less than 0.02 microns). Partial reflection from the metal layer will destructively interfere with the reflection from substrate metal layer and thereby produce a black matrix effect. Absorption will be maximized if the thickness of the oxide layer is chosen to be substantially equal to one quarter of 0.55 microns divided by the refractive index of the oxide layer.

FIG. 8 is a partial isometric cross-sectional diagram, of a portion 2010 of a transflective display, according to an illustration embodiment of the invention. Transflective display apparatus 2010 is similar to reflective display apparatus 10, but transflective display apparatus forms images from a combination of reflected ambient light and transmitted light, emitted from an integral back light 105. Transflective display apparatus 2010 can be used with a transflective light modulation array including an array of transflective shutter assemblies 2102 to modulate both light (e.g., typical backlight beam 801) emitted by backlight 105 and from ambient light (e.g., typical ambient light beam 802) originating from ambient light source 107 towards a viewer through filter array layer 111 and cover sheet 109 to form an image (note that portions of layer 111 and sheet 109, including lens 157 are not shown in FIG. 8 for the sake of simplicity of the drawing).

Transflective shutter assembly 2102 can take substantially the same form as shutter assembly 102 of FIGS. 1-4. However, layer 2118 of assembly 2102 includes a reflective surface 2015 and one or more transmissive apertures 2018 etched through reflective surface 2015 beneath the position of closed shutter 2112 to collectively form exposable surface 2114. At least one portion of reflective surface 2015, having dimensions of from about 2 to about 20 microns, remains beneath the position of closed shutter 2112. The front-most layer of transflective shutter assembly 2102 facing the viewer, including at least the front surface of shutters 2112$a$ and 2112$b$, is coated in a light absorbing film 2152. Thus, when shutter 2112 is closed, ambient light 802 concentrated by funnel 152 onto transflective shutter assembly 2102 is absorbed by film 2152. Likewise, when shutter assembly 2112 is closed the transmission of light through the transmissive aperture 2018 in exposable surface 2114 is blocked. When shutter 2112 is at least partially open (as depicted in FIG. 8), transflective shutter assembly 2102 contributes to the formation of an image both by allowing at least a fraction of backlight-emitted-light 801 to transmit through transmissive apertures 2018 in exposable surface 2114 towards the viewer through funnel 152 and by allowing at least a fraction of the ambient light 802 concentrated onto transflective shutter assembly 2102 to reflect off of the exposed reflective surface or surfaces 2015 of exposable surface 2114 back towards the viewer through funnel 152. The larger the dimensions of the exposed reflective surface or surfaces 2015 of exposable surface 2114 in comparison to the transmissive apertures 2018 become, a more specular mode of reflection is yielded, such that ambient light originating from ambient light source 107 is substantially reflected directly back to the viewer. However, as described above with respect to surface 1015, reflective surface or surfaces 2015 may be roughened in order to provide diffusiveness thereon for combating glare and widening viewing angles of the display 2010.

Even with funnels 152 designed to concentrate ambient light 802 onto one or more of exposed reflective surfaces 2015 that are positioned among transmissive apertures 2018 on exposable surface 2114, some portion of ambient light 802 may pass through apertures 2018 of transfiective shutter assembly 2102. When transfiective shutter assembly 2102 is incorporated into spatial light modulators having optical cavities and light sources, as described in U.S. Pat. No. 7,417, 782, referred to above, the ambient light 802 passing through apertures 2018 enters an optical cavity and is recycled along with the light 801 introduced by backlight 105. In alternative transfiective shutter assemblies, the transmissive apertures in the exposable surface are at least partially filled with a semi-reflective—semitransmissive material or alternately the entire exposable area 2114 con be formed of a semitransmissive semi-reflective material to achieve the same net effect as if portions of the areas are defined as reflective and transmissive.

Figure 9:
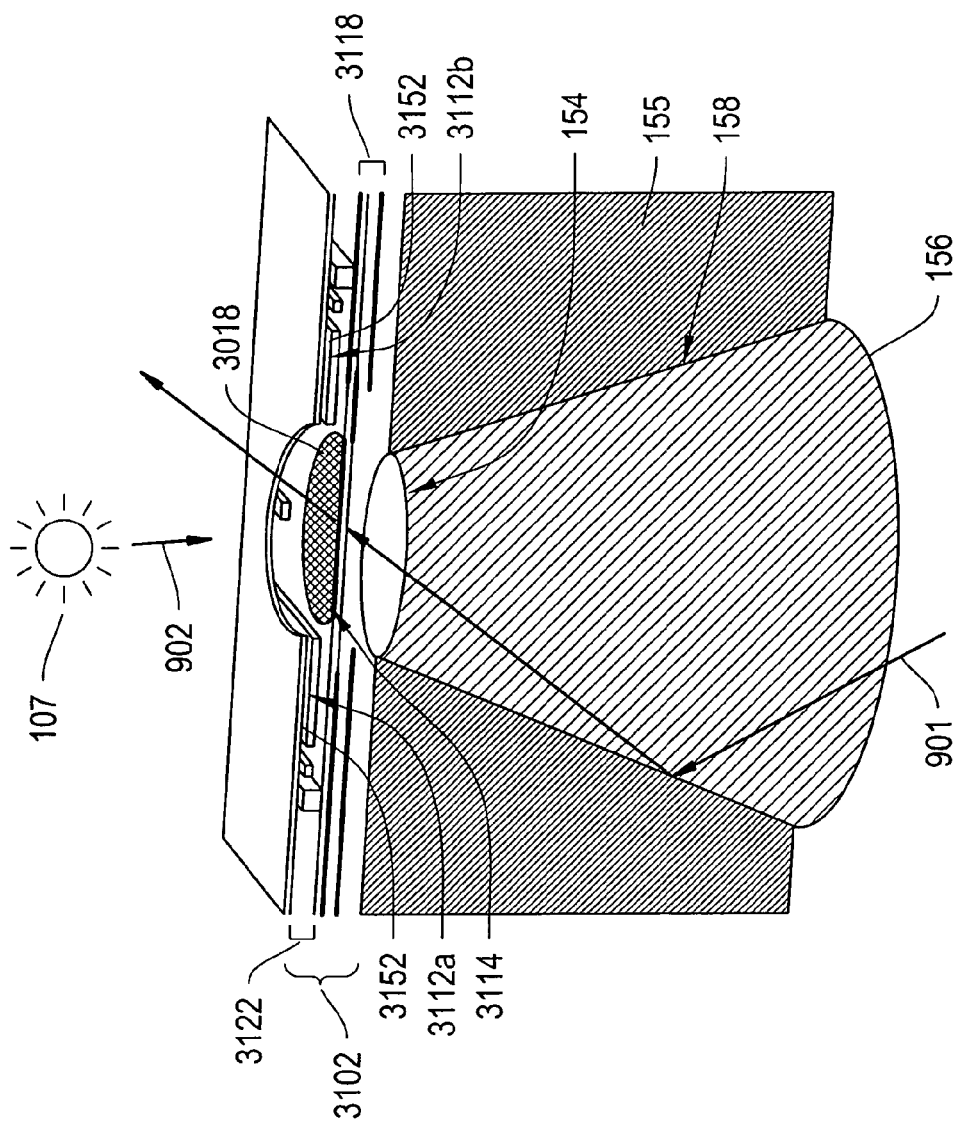
FIG. 9 is a partial isometric cross-sectional view of an individual shutter and pixel assembly of the display apparatus of FIGS. 1-7, implemented as a transmissive-type display, according to an illustrative embodiment of the invention.

FIG. 9 is a partial isometric cross-sectional diagram of a portion of transmissive display apparatus 3010, according to an illustrative embodiment of the invention. As with display apparatus 10 and 2010, transmissive display apparatus 3010 includes an array of shutter assemblies 3102, and an array of light concentrators. In contrast to the previously described display apparatus 10 and 2010, in display apparatus 3010, the array of light modulators is positioned between the array of light concentrators and a viewer. Transmissive shutter assemblies 3102 modulate light (e.g., typical backlight beam 901) emitted by a backlight 105 towards a viewer. Note that color filter layer 111 and cover sheet 109 are not shown in FIG. 9 for the sake of simplicity of the drawing. The filters 111 can be located within display apparatus 3010 anywhere between the backlight and the front of the display apparatus 3010.

Transmissive shutter assembly 3102 can take substantially the same form as shutter assembly 102 of FIGS. 1-4. However, layer 3118 of assembly 3102 includes a transmissive surface 3018 beneath the position of closed shutter 3112 to form exposable surface 3114. The front-most layer of transmissive shutter assembly 3102 facing the viewer, including at least the front surface of shutters 3112*a* and 3112*b*, is coated in a light absorbing film 3152. Thus, when shutter 3112 is closed, ambient light 902 is absorbed by film 3152 and is not reflected back towards the viewer. When shutter 3112 is at least partially open (as depicted in FIG. 9), transmissive shutter assembly 3102 contributes to the formation of an image by allowing at least a fraction of backlight beams 901 to transmit through transmissive surface 3018 (i.e., exposable surface 3114) towards the viewer. An additional light blocking area can be applied around of the transmissive aperture 3114 so that stray light from the backlight cannot get through the light modulation layer un-modulated.

As shown, funnel 152 of light concentration array 150 is provided between shutter assembly 3102 and backlight 105 to concentrate backlight beams 901 entering first optical opening 156 and through second optical opening 154 onto the transmissive region (i.e., transmissive surface 3018 of exposable surface 3114) of transmissive shutter assembly 3102. Thus, use of arrays of transmissive shutter assembly 3102 in display apparatus 3010 with such a configuration of funnels 152 increases the fraction of image forming light (i.e., backlight beams 901) from backlight 105 that gets concentrated onto the modulating surface (i.e., exposable surface 3114) of the display apparatus. The array of light funnels 152 may also serve as a front reflective layer for the backlight to provide for light recycling in the backlight, obviating the need for a separate reflective layer. The light entering the funnels at angles not conducive to making it to the surface 3114 will be reflected back out of the light funnels into the backlight for recycling until such time as it reaches an angle conducive to exit.

It should be noted that, although apparatus and methods for displays utilizing light concentration arrays of the invention have been described as utilizing an array of reflective light funnels (e.g., funnels 152), the invention also relates to apparatus and methods for displays that utilize light concentration arrays of other types of optical elements (i.e., not funnels) for concentrating available image forming light onto an array of light modulators to maximize the contrast ratio of the display. This may be accomplished, for example, with the previously described display apparatus embodiments by replacing each reflective light funnel 152 with a high numerical f-number aperture lens. For example, a high aperture lens, similar to lens 157 shown in FIG. 2, could be utilized without cones 152 in an array 150, according to an alternative embodiment of the invention. Also, while many implementations described herein disclose the utilization of both lens 157 and light funnels 152, the lens are optional in many implementations.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A display apparatus comprising:
   an array of light modulators for selectively reflecting light towards a viewer to form an image;
   an array of reflective light funnels disposed between the array of light modulators and the viewer, for concentrating light on respective ones of the light modulators in the array of light modulators; and
   an array of color filters corresponding to respective ones of the light modulators.

2. The display apparatus of claim 1, wherein one of the reflective light funnels in the array of reflective light funnels comprises a first optical opening directed towards the viewer, a second, smaller optical opening directed towards a respective one of the light modulators, and a reflective wall connecting the first optical opening to the second optical opening.

3. The display apparatus of claim 2, wherein the reflective wall comprises a reflective material deposited on the interior of the reflective light funnel.

4. The display apparatus of claim 2, wherein the wall is generally conical in shape.

5. The display apparatus of the of claim 2, wherein the wall comprises a polygonal cross section.

6. The display apparatus of claim 2, wherein the height of the reflective light funnel is greater than the diameter of the first optical opening.

7. A display apparatus comprising:
   an array of MEMS-based light modulators for selectively modulating light to form an image, one of the MEMS-based light modulators comprising a shutter, wherein the shutter
      comprises a reflective material for reflecting light towards a viewer, and
      selectively obstructs light from impacting a light-absorbing surface behind the shutter with respect to the viewer; and
   an array of reflective light funnels disposed between the array of MEMS-based light modulators and a viewer, for concentrating light on respective ones of the light modulators in the array of light modulators.

8. The display apparatus of claim 7, comprising a backlight.

9. The display apparatus of claim 7, comprising a front light.

10. The display apparatus of claim 7, wherein the one MEMS-based light modulator comprises a second shutter.

11. The display apparatus of claim 10, wherein the first shutter covers a larger area surface than the second shutter.

12. The display apparatus of claim 7, comprising an array of color filters corresponding to respective ones of the light modulators.

13. The display apparatus of claim 12, wherein the array of color filters includes a plurality of red filters, green filters, and blue filters.

14. The display apparatus of claim 12, wherein the array of color filters includes a plurality of white filters.

15. The display apparatus of claim 7, wherein one of the reflective light funnels in the array of reflective light funnels comprises a first optical opening directed towards the viewer, a second, smaller optical opening directed towards a respective one of the light modulators, and a reflective wall connecting the first optical opening to the second optical opening.

16. The display apparatus of claim 15, wherein the reflective wall comprises a reflective material deposited on the interior of the reflective light funnel.

17. The display apparatus of claim 15, wherein the reflective wall comprises a substantially transparent interior coated by a reflective material.

18. The display apparatus of claim 15, wherein the wall is generally conical in shape.

19. The display apparatus of claim 15, wherein the wall has a hexagonal cross section.

20. The display apparatus of claim 15, wherein the wall has a rectangular cross section.

21. The display apparatus of claim 15, wherein the wall comprises a polygonal cross section.

22. The display apparatus of claim 15, wherein the height of the one reflective light funnel is smaller than the diameter of the first optical opening.

23. The display apparatus of claim 15, wherein the height of the one reflective light funnel is greater than the diameter of the first optical opening.

24. A display apparatus comprising:
- an array of MEMS-based light modulators for selectively modulating light to form an image, one of the MEMS-based light modulators comprising a shutter, wherein the shutter comprises a light-absorbing material; and
- an array of reflective light funnels disposed between the array of MEMS-based light modulators and a viewer, for concentrating light on respective ones of the light modulators in the array of light modulators.

25. The display apparatus of claim 24, comprising a backlight.

26. The display apparatus of claim 25, wherein the MEMS-based light modulators selectively transmit light from the backlight towards the viewer and selectively reflect light originating from the direction of the viewer.

27. The display apparatus of claim 24, comprising a front light.

28. The display apparatus of claim 24, wherein the shutter selectively obstructs light from impacting a reflective surface behind the shutter with respect to the viewer.

29. The display apparatus of claim 24, wherein the one MEMS-based light modulator comprises a second shutter.

30. The display apparatus of claim 29, wherein the first shutter covers a larger area surface than the second shutter.

31. The display apparatus of claim 24, comprising an array of color filters corresponding to respective ones of the light modulators.

32. The display apparatus of claim 31, wherein the array of color filters includes a plurality of red filter, green filters, and blue filters.

33. The display apparatus of claim 31, wherein the array of color filters includes a plurality of white filters.

34. The display apparatus of claim 24, wherein one of the reflective light funnels in the array of reflective light funnels comprises a first optical opening directed towards the viewer, a second, smaller optical opening directed towards a respective one of the light modulators, and a reflective wall connecting the first optical opening to the second optical opening.

35. The display apparatus of claim 34, wherein the reflective wall comprises a reflective material deposited on the interior of the reflective light funnel.

36. The display apparatus of claim 34, wherein the reflective wall comprises a substantially transparent interior coated by a reflective material.

37. The display apparatus of claim 34, wherein the wall is generally conical in shape.

38. The display apparatus of claim 34, wherein the wall has a hexagonal cross section.

39. The display apparatus of claim 34, wherein the wall has a rectangular cross section.

40. The display apparatus of claim 34, wherein the wall comprises a polygonal cross section.

41. The display apparatus of claim 34, wherein the height of the one reflective light funnel is smaller than the diameter of the first optical opening.

42. The display apparatus of claim 34, wherein the height of the one reflective light funnel is greater than the diameter of the first optical opening.

\* \* \* \* \*